(12) United States Patent  
Iino

(10) Patent No.: US 7,530,516 B2
(45) Date of Patent: May 12, 2009

(54) STRUCTURE TO BE GRASPED

(75) Inventor: Wataru Iino, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1025 days.

(21) Appl. No.: 11/037,007

(22) Filed: Jan. 19, 2005

(65) Prior Publication Data

US 2005/0158491 A1 Jul. 21, 2005

(30) Foreign Application Priority Data

Jan. 20, 2004 (JP) ............................. 2004-011604

(51) Int. Cl.
G11B 23/07 (2006.01)
(52) U.S. Cl. .................................. 242/338.1; 242/348
(58) Field of Classification Search .................. 242/342, 242/348, 611, 611.1, 612, 338.1, 343, 343.1, 242/343.2; 360/132

See application file for complete search history.

(56) References Cited

U.S. PATENT DOCUMENTS 6,273,352 B1 * 8/2001 Johnson et al. ............. 242/348
6,563,671 B2 * 5/2003 Morita et al. ............... 360/132
6,581,866 B2 * 6/2003 Tsuyuki et al. ............. 242/348
7,059,554 B2 * 6/2006 Hiraguchi et al. ......... 242/338.1
7,284,723 B2 * 10/2007 Ishihara et al. ............. 242/348
7,407,126 B2 * 8/2008 Hiraguchi ................ 242/338.1

* cited by examiner

Primary Examiner—William A Rivera
(74) Attorney, Agent, or Firm—Sughrue Mion, PLLC

(57) ABSTRACT

A structure to be grasped in which a member can be grasped by a pair of grasping portions having respective grasping recesses of the same shape. A clutch member has rotation-limiting ribs and seating ribs formed on and projecting from a clutch body, and each set of a rotation-limiting rib and a seating rib are arranged on an imaginary straight line L1. When a pair of chuck members of a grasping device are moved away from each other along an imaginary straight line L2 coinciding with the imaginary straight line L1, the clutch member is grasped by the pair of chuck members. Although the rotation-limiting ribs and the seating ribs are different in shape from each other in order to meet their respective functional requirements, chucked portions of the rotation-limiting rib and seating rib, for fitting into the respective grasping recesses of the chuck members, have substantially the same shape.

12 Claims, 13 Drawing Sheets

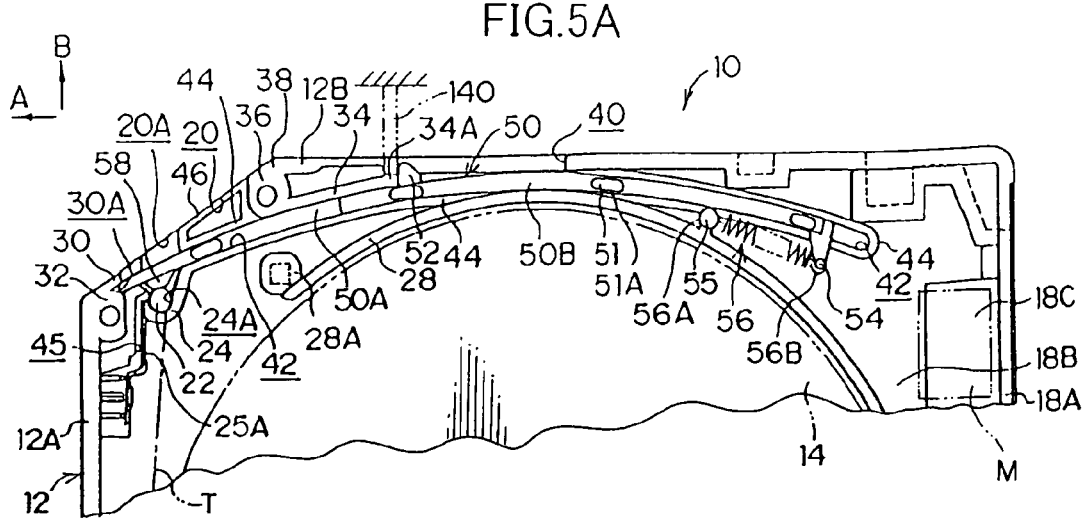
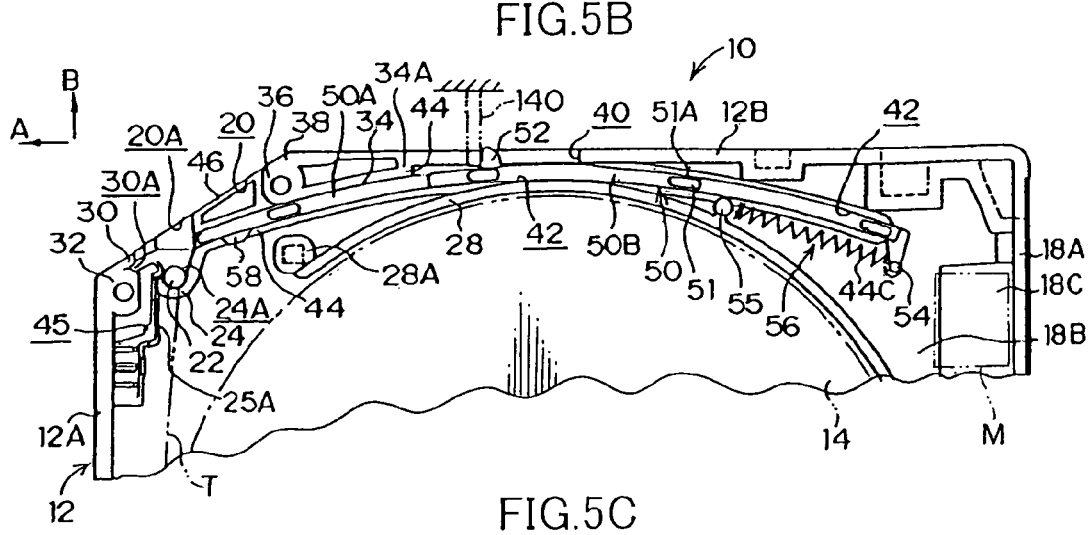
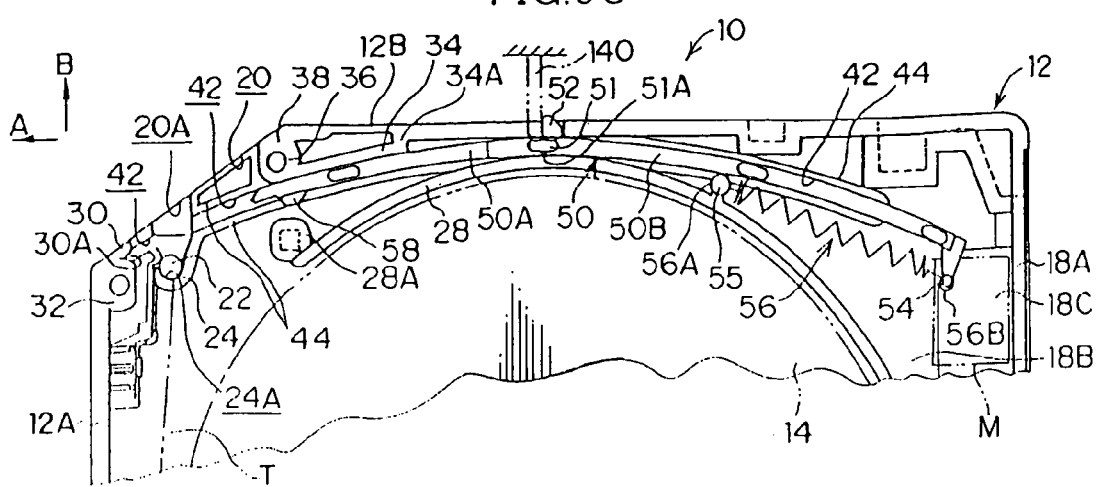

STRUCTURE TO BE GRASPED

CROSS-REFERENCE TO RELATED APPLICATION

This application claims priority under 35USC 119 from Japanese Patent Application No. 2004-11604, the disclosure of which is incorporated by reference herein.

BACKGROUND OF THE INVENTION

1. Field of the Invention

This invention relates to a structure to be grasped applicable to a member which is to be grasped by a grasping device at a set of two projecting portions formed on and projecting from a body portion of the structure.

2. Description of the Related Art

When, for example, a member is to be mounted on another member by an automatic assembling apparatus, a grasping device, mounted on a distal end of a robot arm or an actuator of the automatic assembling apparatus, grasps or grips the member with a pair of grasping portions thereon. In this grasping state the robot arm or the like is operated so as to mount this member on another member.

One example of such a member is one that includes a cylindrical body portion, and a set of two projecting portions which are formed on and project from one end surface of the body portion, and also extend outwards radially from the body portion. For mounting this member on another (other) member, positioned at the opposite end of the body portion to the end on which the set of two projecting portions formed, there are occasions when the set of two projecting portions are grasped by a grasping device.

Here, there is no problem when the set of two projecting portions have the same shape. However, complications arise, when the set of two projecting portions are different in shape from each other, so as to meet functional requirements. Here, since the grasping portions of the grasping device and the projecting portions need to contact each other at least at two surfaces, so that the projecting portions will not move relative to the grasping portions, the set of two grasping portions of the grasping device must be formed respectively into different shapes according to the shapes of the corresponding projecting portions.

An inefficient structure to be grasped, will be specifically described with reference to FIG. 13. A member 200 has a set of two rectangular plate-like projecting portions 204 and 206 formed on a cylindrical body portion 202 and projecting from an end surface thereof. The projecting portions 204 and 206 are disposed on an imaginary straight line L3 coinciding with a diametrical line of the body portion 202, and are elongated along the imaginary straight line L3 when viewed from above. To meet functional requirements, the projecting portions 204 and 206 have different thicknesses (widths) t4 and t5 ($\neq$t4) in a direction perpendicular to the imaginary straight line L3. Therefore, in a grasping device for grasping the member 200 at the set of two projecting portions 204 and 206 thereof, grasping recesses 208A and 210A, formed respectively in a set of two grasping portions 208 and 210, have respective widths of w4 and w5 ($\neq$w4), corresponding respectively to the thicknesses t4 and t5. With this construction, the member 200, when grasped by the set of two grasping portions 208 and 210, will not rattle or displace relative thereto.

In this structure to be grasped, however, the degrees of freedom for the rotational position of the member 200 relative to the grasping device is low. Namely, in a case where the set of two projecting portions 204 and 206 have the same shape (and hence have the same width), there exist two graspable positions per rotation of the member 200 about the axis of the body portion 202 (where the grasping portions 208 and 210 can grasp the member 200). However, with this structure in a case where the set of two projecting portions 204 and 206 are different in shape from each other, the projecting portion 206 can not be fitted into the grasping recess 208A, and therefore there exists only one graspable position per rotation of the member 200. Therefore, the ease of assembly of member 200 on another member using an automatic assembling apparatus was low.

SUMMARY OF THE INVENTION

With the foregoing in view, it is an object of this invention to provide a structure to be grasped which enables a member to be grasped by a set of two grasping portions having respective grasping recesses thereon both of the same shape.

According to an aspect of the present invention, there is provided a structure to be grasped of a member including a set of two projecting portions which are formed on and project from a body portion thereof, and are disposed on an imaginary straight line, wherein a pair of grasping portions of a grasping device are moved away from each other along said imaginary straight line to abut respectively against said projecting portions, so that said member is grasped by said grasping device; wherein one of said projecting portions includes a first grasped portion which can be fitted into a grasping recess, formed on one of said grasping portions, so as to be prevented from moving in a direction perpendicular to said imaginary straight line, and a first function portion which is integral with said first grasped portion, and is so formed as to perform a required function; and wherein the other of said projecting portions is different in shape from said one projecting portion but includes a second grasped portion which is substantially similar in shape to said first grasped portion.

Other objects, features and advantages of the present invention will be apparent to those skilled in the art from the explanation of the preferred embodiments of the present invention illustrated in the appended drawings, and from the appended claims.

BRIEF DESCRIPTION OF THE DRAWINGS

FIG. 5A is a plan view of a portion of the recording tape cartridge with the upper casing removed, showing a process of opening an opening in the recording tape cartridge, in which an engagement projection of a drive unit is in the state of initial engagement with an operating projection of a door, FIG. 5B is a view similar to FIG. 5A, but showing a condition in which the opening is in the process of being opened; ad FIG. 5C is a view similar to FIG. 5A, but showing a condition in which the opening is fully opened;

DETAILED DESCRIPTION OF THE INVENTION

FIGS. 1A to 10 show a recording tape cartridge 10 to which a first embodiment of a structure to be grasped of the present invention is applied.

First, the overall construction of the recording tape cartridge 10, the constructions of an opening and a door, and the constructions of a reel and braking means will be described. Then the structure to be grasped by which a clutch member is grasped by a grasping device will be described. For description purposes, a direction (indicated by arrow A) of loading of the recording tape cartridge 10 into a drive unit will be called the front direction (front side thereof), and a direction (indicated by arrow B) perpendicular to the direction of arrow A will be called the right direction.

(Overall Construction of a Recording Tape Cartridge)

Figure 2:
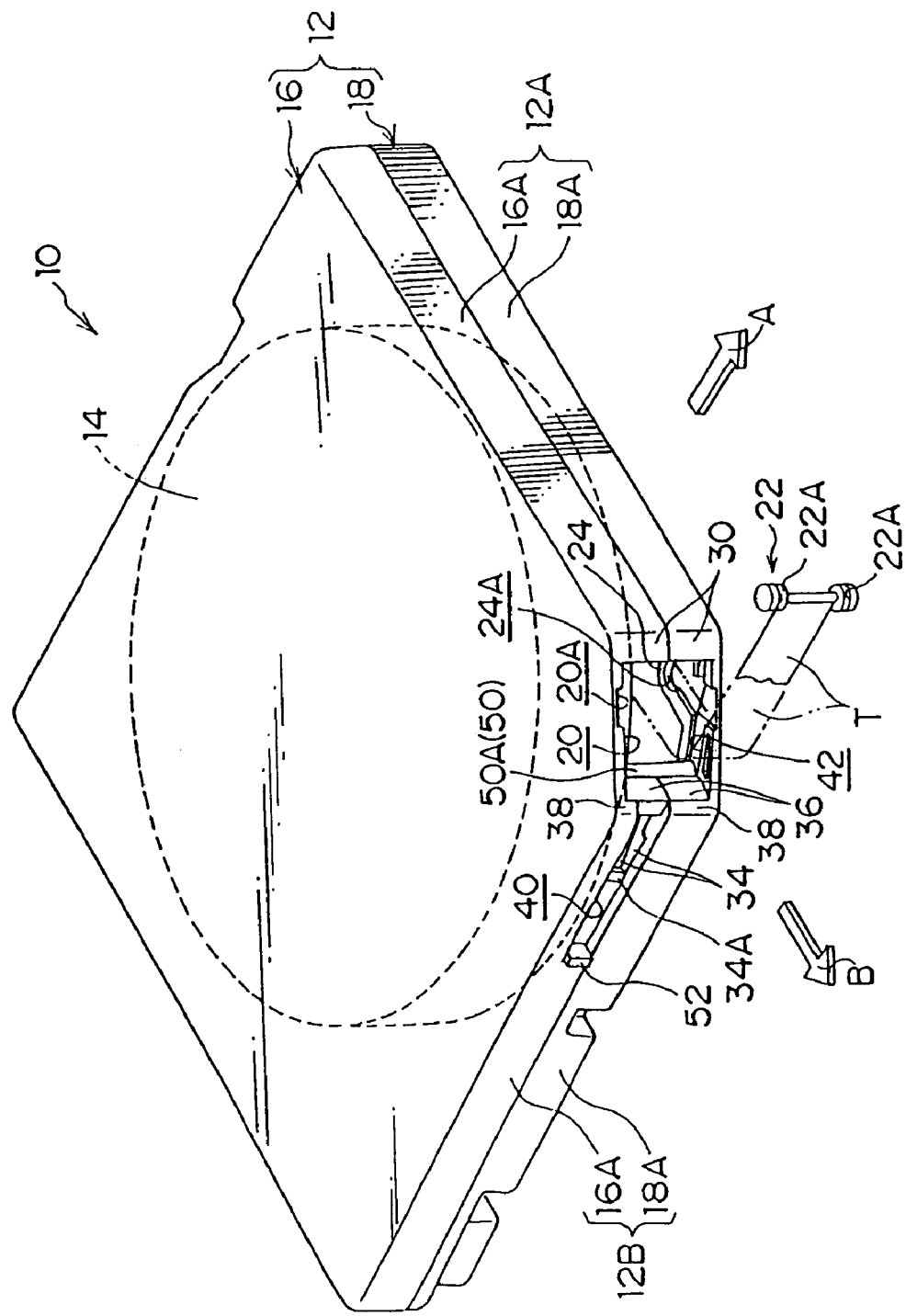
FIG. 2 is a perspective view showing the overall construction of a recording tape cartridge to which the structure to be grasped of the first embodiment is applied.

FIG. 2 is a perspective view showing the overall construction of the recording tape cartridge 10. As shown in this figure, the recording tape cartridge 10 includes a single reel 14 rotatably accommodated within a casing 12 having a generally rectangular shape when viewed from above, and a magnetic tape T (i.e., a recording tape serving as a medium for information recording/reproducing) is wound on the reel 14.

The casing 12 comprises an upper and a lower casing 16 and 18 joined together at their respective peripheral walls 16A and 18A in abutting each other. A front right corner portion (one corner portion of the leading edge in the loading direction into a drive unit) of each of the upper and lower casings 16A and 18A being notched and removed. A space for receiving the reel 14 having the magnetic tape T wound thereon is provided within the casing 12. The front right corner of the casing 12 where the peripheral wall 16A and a top plate 16B of the upper casing 16 and the peripheral wall 18A and a bottom plate 18B of the lower casing 18 are removed serves as the opening 20 from which the magnetic tape T is drawn out. The detailed constructions of the opening 20 and door 50 for opening and closing the opening 20 will be described later.

A leader pin 22 is connected to a free end of the magnetic tape T which can be drawn from the opening 20, and the leader pin 22 is retainingly engaged with a drawing means of a drive unit that operates so as to draw out the leader pin 22. Annular grooves 22A are formed respectively at opposite end portions of the leader pin 22 extending respectively beyond opposite side edges of the magnetic tape T. The annular grooves 22A are retainingly engaged with hooks or the like of the drawing means. With this construction, when the magnetic tape T is drawn, the hooks or the like will not contact the magnetic tape T, and therefore will not damage the magnetic tape T.

A pair of upper and lower pin holders 24 for positioning and holding the leader pin 22 within the casing 12 are provided inside the opening 20 of the casing 12. Each of the pin holders 24 has a generally semi-cylindrical shape open in the direction of arrow B, and the respective end portions of the upstanding leader pin 22 can be held in recesses 24A of the pin holders 24. The pin holder 24 is formed integrally with a rib 44 (described later).

A leaf spring 25 is provided near to each pin holder 24 in a fixed manner, and arm portions 25A of the leaf springs 25 can be engaged with the respective upper and lower end portions of the leader pin 22 to hold the leader pin 22 in the pin holders 24. When the leader pin 22 moves into and out of the pin holders 24, the arm portions 25A of the lead springs 25 are suitably resiliently deformed to allow the movement of the leader pin 22.

A gear opening 26 is formed through a central portion of the bottom plate 18B of the lower casing 18, and a reel gear 79 (described later) and a reel plate 82 of the reel 14 are exposed to the exterior through this gear opening 26. An annular rib 27 for positioning the reel 14 is formed at a peripheral edge of the gear opening 26 in the lower casing 18, and projects inside the casing 12. A play-limiting wall (inner wall) 28 for preventing the shaking of the reel 14 is formed in an interrupted manner on the inner surface of each of the upper and lower casings 16 and 18, and is disposed on a circle concentric with the gear opening 26.

An enveloping portion 28A, having a position-restricting hole therein, is formed integrally at an end portion of the play-limiting wall 28, disposed near to the opening 20. Further, an enveloping portion 28B is formed upright within a space defined by the front left corner portion of the casing 12 and the play-limiting wall 28, and this enveloping portion 28B has a generally oval position-restricting hole formed therein, elongated in the right-left direction. The enveloping portions 28A and 28B are disposed on a straight line extending in the direction of arrow B. The play-limiting walls 28 are connected respectively to the peripheral walls 16A and 18A of the casing 12 at their end portions except the end portions at which the enveloping portion 28A is integrally provided, and with this construction, the space for installing the reel 14 therein is separated from the spaces outside this installation space.

A memory board M (see FIGS. 5A to 5C), storing various information for each recording tape cartridge 10, can be set in a rear right portion of the lower casing 18. In order that detection can be made by a drive unit (capable of reading the information from the lower side of the casing) and a library unit (capable of reading the information from the rear side of the casing), part of the peripheral wall 18A is inclined into a slanting rear wall 18C inclined at a predetermined angle, and the memory board M can be set along this slanting rear wall 18C in an inclined manner at a predetermined angle.

(Construction of Opening and Casing in the Vicinity of the Opening)

Figure 3:
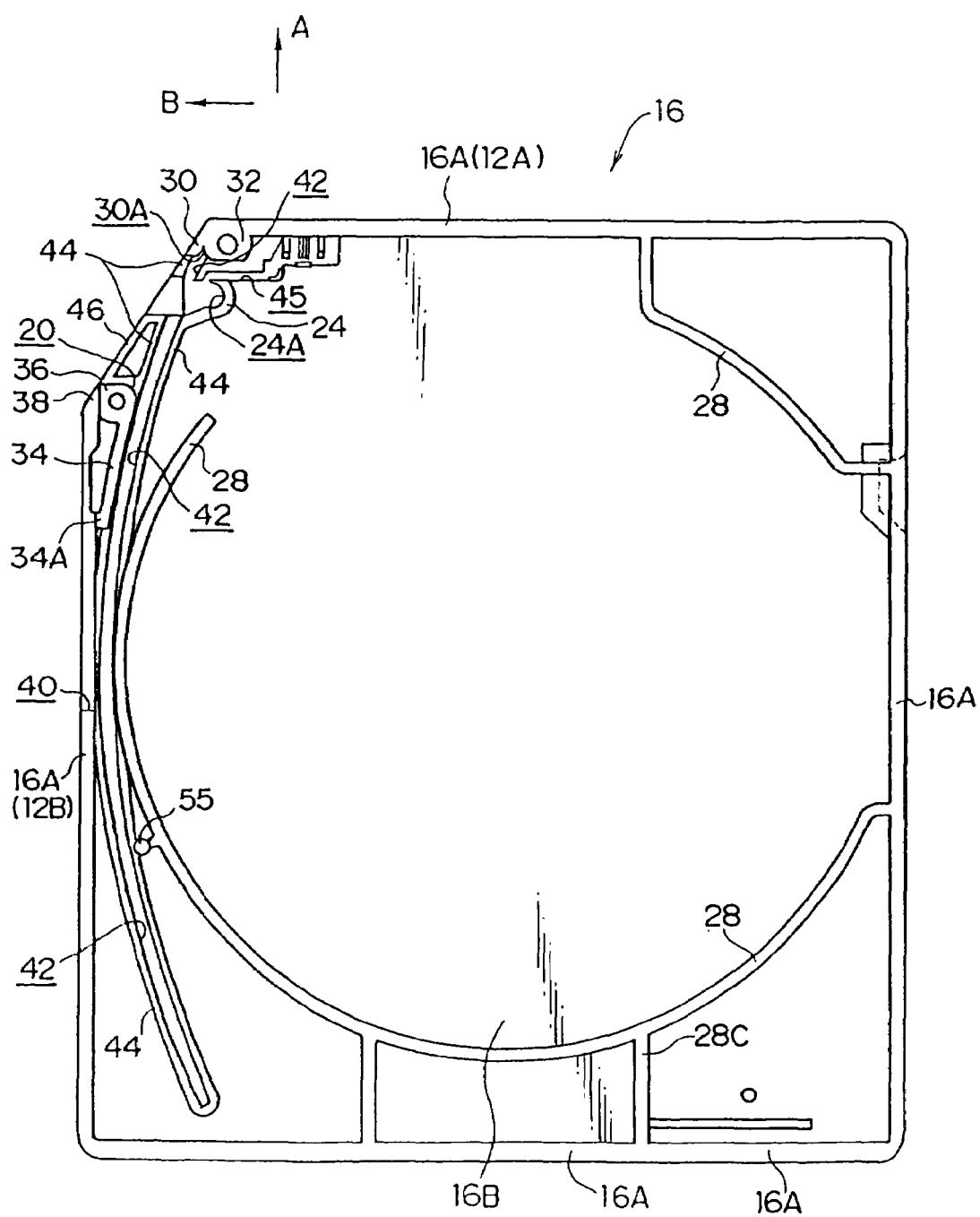
FIG. 3 is a bottom view of an upper casing of the recording tape cartridge to which the structure to be grasped of the first embodiment is applied.
Figure 4:
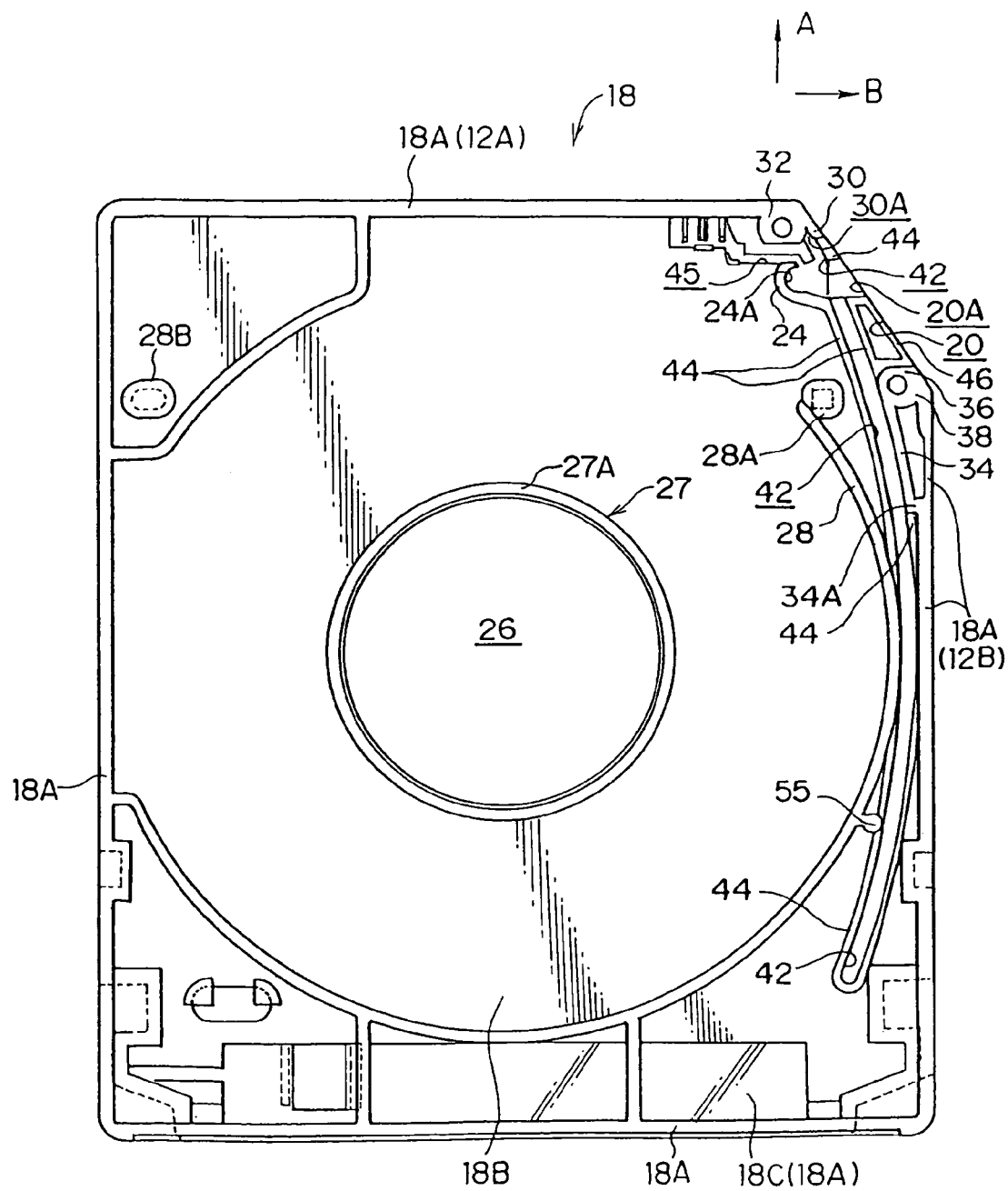
FIG. 4 is a plan view of a lower casing of the recording tape cartridge.

As shown in FIGS. 3 and 4, which are respectively a bottom view of the upper casing 16 and a plan view of the lower casing 18, a pair of upper and lower screw bosses 32 are formed at a front edge portion of the opening 20, while a pair of upper and lower screw bosses 36 are formed at a rear edge portion of the opening 20. The screw bosses 32 and 36 and other screw bosses (not shown) serve as screw fastening portions for joining the upper and lower casings 16 and 18 together.

The screw bosses 32, disposed at the front edge portion of the opening 20, are continuous with a right end portion of a front wall 12A (i.e., those portions of the peripheral walls 16A and 18A having their outer surfaces facing in the direction of arrow A) of the casing 12. The screw bosses 32 are also continuous respectively with a pair of upper and lower dust protective walls 30 extending a small distance from the right end of the front wall 12A in a curved manner generally along the open side of the opening 20. A recess 30A for receiving a distal end portion of the door 50 (described later) is formed between the screw boss 32 and the dust protective wall 30.

On the other hand, the respective screw bosses 36, disposed at the rear edge portion of the opening 20, are continuous with curved walls 38 formed at a front end of a right wall 12B (i.e., those portions of the peripheral walls 16A and 18A that run along the direction of arrow A on the right side) of the casing 12, and extending in a curved manner generally along the open side of the opening 20. The respective screw bosses 36 also are continuous with front ends of a pair of upper and lower circular arcuate walls 34 provided inside of the right wall 12B. The upper and lower circular arcuate walls 34, when viewed from above, have a circular arcuate shape generally corresponding to the shape of the outer peripheral surface of the door 50 (that is, the shape of a path of movement thereof). The circular arcuate walls 34 extend rearwards a predetermined distance from the respective screw bosses 36, and are integrally connected at their rear ends to the right wall 12B (that is, the peripheral walls 16A and 18A) via respective short interconnecting walls 34A.

A slit 40 of a predetermined length (through which the inside and outside of the casing 12 communicate with each other) is formed in the right wall 12B of the casing 12, and an operating projection 52 of the door 50 (described later) is exposed to the exterior through this slit 40. The slit 40 is formed by notching a lower portion of that portion of the peripheral wall 16A forming the right wall 12B, and a lower portion of the corresponding curved wall 38 is also notched, so that the slit 40 is open to the front side.

Guide grooves 42 for guiding the door 50 are provided at the respective upper and lower casings 16 and 18 jointly forming the casing 12. Each guide groove 42 has groove walls formed by the rib 44 formed perpendicularly on the top plate 16B of the upper casing 16 or the bottom plate 18B of the lower casing 18, the right wall 12B (the peripheral wall 16A or the peripheral wall 18A), and the play-limiting wall 28. The top plate 16B or the bottom plate 18B are formed without thinning of the respective thickness thereof. The rib 44 is also formed integral to the pin holder 24.

Each guide groove 42 is formed into a circular arcuate shape disposed on a predetermined circle, and extends from the recess 30A (serving as its proximal end) to the rear right corner portion of the casing 12. This predetermined circle is so determined as to pass outside of the screw boss 32, inside of the screw boss 36 and between the right wall 12B and the play-limiting wall 28. In this embodiment, the center of this predetermined circle (serving as an axis of revolution (or angular movement) of the door 50) is so determined that its position in the right-left direction is disposed outwardly of the left end of the casing 12 while its position (coordinates) in the forward-rearward direction generally coincides with the axis of rotation of the reel 14 (that is, the axis of the play-limiting wall 28).

That portion of the guide groove 42 which is exposed to the opening 20 is caused to communicate with the recess 24A and also with a spring groove 45 (in which the arm portion 25A of the leaf spring 25 is located) by notching the rib 44 at the right side of the pin holder 24. At the notched portion of the guide groove 42, a tapering opening 20A for introducing the leader pin 22 into the casing 12 communicates with the recess 24A of the pin holder 24. Further, a rib 46 is formed integrally with the rib 44, and extends along the rear edge of the tapering opening 20A, the front edge of the screw boss 36 and the open side of the opening 20, thereby securing or enhancing the strength of the casing 12 around the opening 20.

A rear portion of each rib 44, forming a rear half portion of the guide groove 42, is formed into a substantially U-shape, so that the rear end of the rib 44 is folded back on itself and closed. The rib 44 on the upper casing 16 is formed to extend rearwards longer than the rib 44 on the lower casing 18. This construction is provided so that the memory board 50, provided at the right wall 12B, will not interfere with the door 50, since the slanting rear wall 18C (the peripheral wall 18A) of the lower casing 18 is inclined at the predetermined angle.

A pair of upper and lower spring retainer pins 55 are provided at the inner sides of the respective rear portions of the ribs 44 at central longitudinal portions thereof. The spring retainer pins 55 are formed integrally with the respective play-limiting walls 28, and the spring retainer pin 55 on the lower casing 18 is longer than the spring retainer pin 55 on the upper casing 16. An annular portion 56A, formed at one end of a coil spring 56, is engaged with (or hooked onto) the portion of the spring retainer pin 55 on the lower casing 18 projecting upwardly beyond the play-limiting wall 28. The shorter spring retainer pin 55 on the upper casing 16 is held against the spring retainer pin 55 on the lower casing 18, thereby preventing the coil spring 56 from being disengaged from the spring retainer pins.

The upper and lower casings 16 and 18, described above, are held against each other at their peripheral walls 16A and 18A, and in this condition screws (not shown) are threaded into the screw bosses 32 and 36 and other screw bosses from the lower side of the casing, thereby fixing (joining) the upper and lower casings 16 and 18 together, thus providing the casing 12. The upper casing 16 as well as the lower casing 18 is molded of a synthetic resin such that the various portions thereof are formed integrally with one another.

(Construction of Door)

The opening 20 can be opened and closed by the door 50 serving as a screening member. The plate-like door 50 is curved in its longitudinal direction, and has a circular arcuate shape whose curvature coincides with the curvature of the guide groove 42 (that is, the curvature of the predetermined circle) when viewed from above. A front portion (which closes at least the opening 20) of the plate-like door 50 is substantially equal in width to the height of the opening 20 and serves as a closing portion 50A, and a portion of the door 50 which extends rearwardly from the closing portion 50A, and is marginally smaller in width than the closing portion 50A, serves as a drive portion 5OB.

The length (curved longitudinal size) of the door 50 is so determined that the rear edge portion of the drive portion 5OB is located near the rear right corner portion of the casing 12 when the door 50 closes the opening 20 (see FIG. 5A). A lower edge portion of a rear portion of the drive portion 5OB is notched or removed obliquely so that this drive portion 50B will not interfere with the memory board M provided at the slanting rear wall 18C of the lower casing 18.

The door 50 closes the opening 20, with the distal end portion of the closing portion 50A received in the recess 30A disposed outside the screw boss 32 (see FIG. 5A), and can be moved (angularly moved) substantially rearward along the guide grooves 42 to open the opening 20 (see FIG. 5B). When the outer peripheral surface of the distal end portion of the closing portion 50A reaches the inner side of the screw boss 36, the door 50 fully opens the opening 20 (see FIG. 5C). The door 50 can be angularly moved in a direction opposite to the door-opening direction so as to close the opening 20.

Thus, the door 50 is formed into a curved shape, and is angularly moved along its movement path (disposed on the predetermined circle) without deviation therefrom so as to open and close the opening 20. The axis of angular movement of the door 50 and its radius (determining the configuration of the guide groove 42) can be suitably determined according to: the positions of the front and rear edges of the opening 20 (that is, the positions of the screw bosses 32 and 36) determined by requirements of the drive unit; the angle of the opening side of the opening 20 determined by requirements of the library unit, and so on.

A plurality of convex portions 51 are formed on and project from the upper and lower edges of the door 50 received in the respective upper and lower guide grooves 42. Although the heights of projection of the convex portions 51 are different between the closing portion 50A and the drive portion 50B, distal ends of these convex portions 51 are substantially equidistant from a width centerline running longitudinally along the door 50 and extend in the longitudinal direction of the door 50. With this construction, the upper convex portions 51 is held in sliding contact with the top plate 16B defining the bottom of the upper guide groove 42, while the lower convex portions 51 are held in sliding contact with the bottom plate 18B defining the bottom of the lower guide groove 42.

Projections 51A are formed respectively on both sides of each convex portion 51 projecting out on both sides in the direction of the thickness of the door 50, and are held in sliding contact with the respective groove walls (defined by the ribs 44, etc.,) of the corresponding guide groove 42. The foremost convex portions 51 are so disposed as not to be received in the respective tapering openings 20A (communicating with the respective guide grooves 42) during the opening and closing of the opening 20. Thanks to the provision of the convex portions 51 and the projections 51A, the door 50, while guided by the guide grooves 42, can be reliably angularly moved along the movement path, passing the outside of each screw boss 32, the inside of each screw boss 36 and between the right wall 12B and each play-limiting wall 28, without deviating from the movement path during the opening and closing of the opening 20.

The operating projection 52, serving as an operating portion, is formed on and projects radially outwardly from the outer peripheral surface of the drive portion 50B of the door 50 at a front end portion thereof disposed adjacent to the closing portion 50A. The operating projection 52 extends through the slit 40, and is exposed to the exterior of the casing 12. In accordance with the loading (relative movement) of the recording tape cartridge 10 into the drive unit, the operating projection 52 is brought into engagement with an engagement projection 140 entering the slit 40 through the open front end thereof, thereby moving the door 50 in the direction to open the opening 20.

A spring retainer portion 54 of a substantially L-shape is formed on and projects from the inner surface of the drive portion 50B of the door 50 at the rear end thereof, and an upper end of the spring retainer portion 54 is a free end. The coil spring 56, serving as urging means, is retainingly held on this spring retainer portion 54. More specifically, annular portions 56A and 56B for retaining purposes are formed at opposite ends of the coil spring 56. The spring retainer pins 55 of the casing 12 are passed through the annular portion 56A, and maintaining engagement with the casing 12, while the spring retainer portion 54 is passed through the annular portion 56B, maintaining engagement with the door 50.

With this construction, the door 50 is urged in the direction to close the opening 20 by an urging force of the coil spring 56, and therefore normally closes the opening 20. The door 50 has such a length that the door 50 reaches the rear right corner portion of the casing 12 in the closed condition of the opening 20 as described above. Therefore the coil spring 56 can be mounted within the casing 12, effectively utilizing a space near the rear right corner portion which space is formed between the play-limiting walls 28 and the peripheral walls 16A and 18A (slanting rear wall 18C).

A stopper 58 is formed on and projects from the inner surface of the closing portion 50A of the door 50, and this stopper 58 abuts against side surfaces of the upper and lower end portions of the leader pin 22 when the opening 20 is closed by the door 50, thereby positively preventing the leader pin 22 from being disengaged from the pin holders 24 in the case of a drop impact or the like.

In accordance with the loading of the recording tape cartridge 10 into the drive unit, the operating projection 52 is brought into engagement with the engagement projection 140 of the drive unit (see FIGS. 5A to 5C), and the door 50 is moved relative to the casing 12, against the urging force of the coil spring 56, opening the opening 20. When the recording tape cartridge 10 is unloaded from the drive unit, the door 50 is moved by the urging force of the coil spring 56 closing the opening 20.

This construction means that the door 50, curved into the circular arcuate shape, is angularly moved along the movement path, corresponding to this curved shape, around the reel 14 and outside of the pin holders 24 (and hence the leader pin 22) without deviating from the movement path. Also with this construction the door opens and closes the opening 20, inclined relative to the direction of arrow A, and during the opening and closing of the opening 20, the door 50 does not project from the region defining the outer shape of the casing 12.

(Constructions of Reel and Braking Means)

Figure 6:
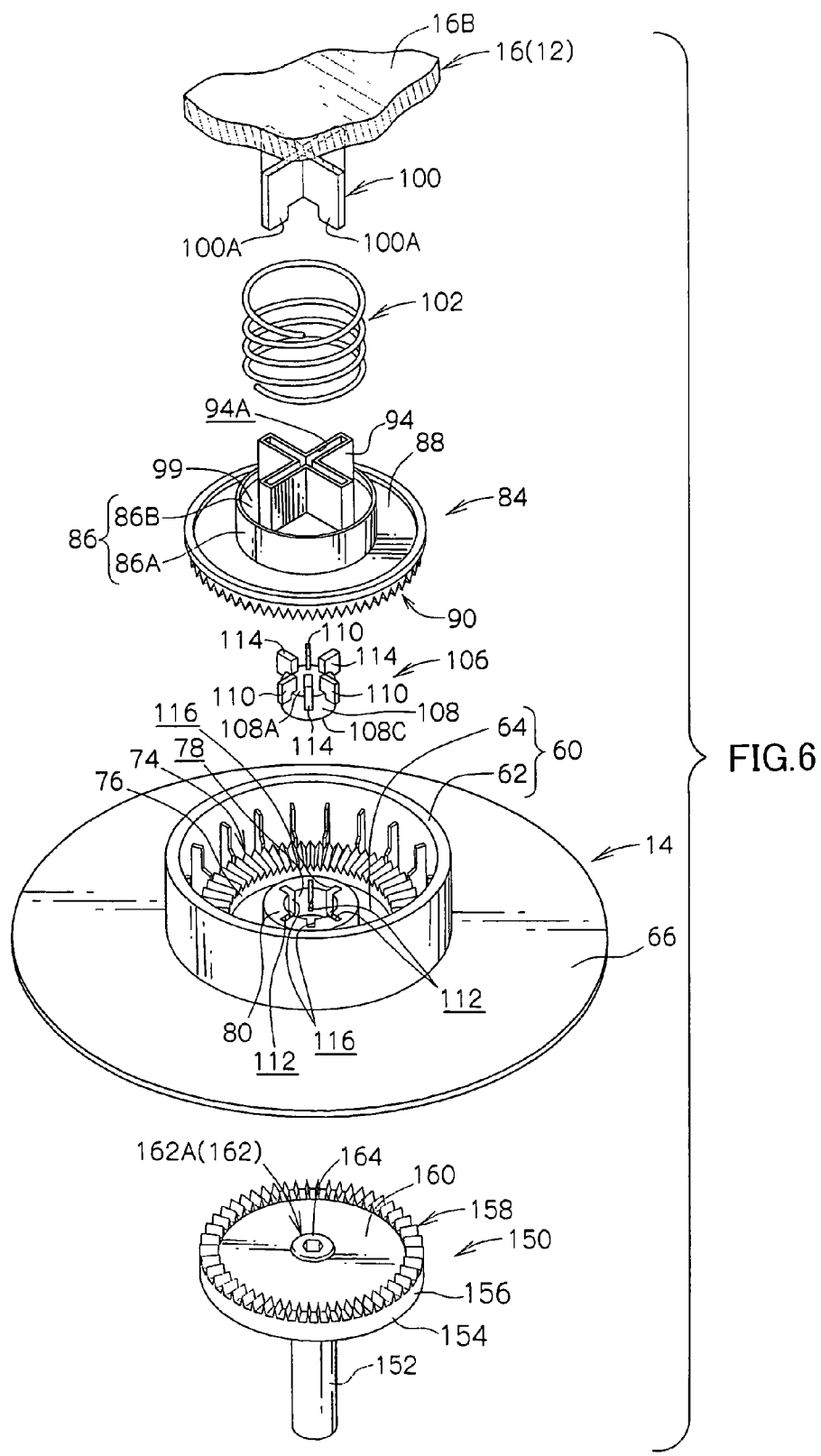
FIG. 6 is an exploded, perspective view showing a reel, brake means, etc., of the recording tape cartridge as seen from the upper side.
Figure 8:
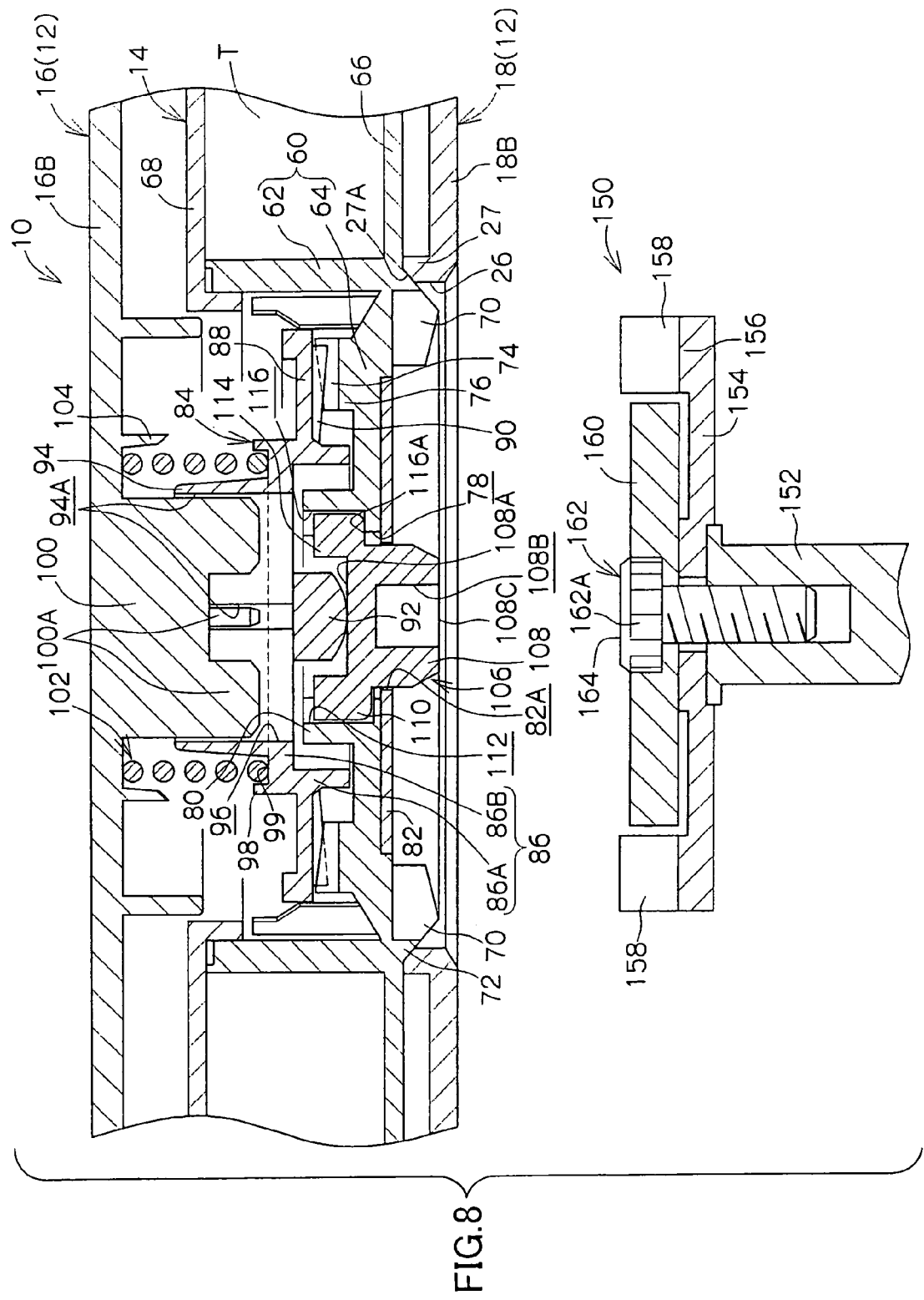
FIG. 8 is a cross-sectional view of the recording tape cartridge, showing a condition in which the reel is locked against rotation.

As shown in FIGS. 6 and 8, the reel 14 includes a reel hub 60 forming its axis portion. The reel hub 60 has a substantially bottom-closed cylindrical shape, and includes a cylindrical portion 62 having an outer peripheral surface on which the magnetic tape T is wound, and a bottom plate portion 64 closing a bottom of the cylindrical portion 62. A lower flange 66 is formed integrally on and extending outwards radially from the outer peripheral surface of the reel hub 60 at a lower end portion thereof (at which the bottom plate portion 64 is provided) in coaxial relation thereto. An upper flange 68, corresponding to the lower flange 66, is joined to an upper end of the reel hub 60 by ultrasonic welding or the like in coaxial relation thereto (the showing of this upper flange 68 is omitted in FIGS. 6 and 10). With this construction, the reel 14 is so formed that the magnetic tape T can be wound on the outer peripheral surface of the cylindrical portion 62 of the reel hub 60 lying between opposed surfaces of the lower and upper flanges 66 and 68. The cylindrical portion 62 is open at the top.

Figure 7:
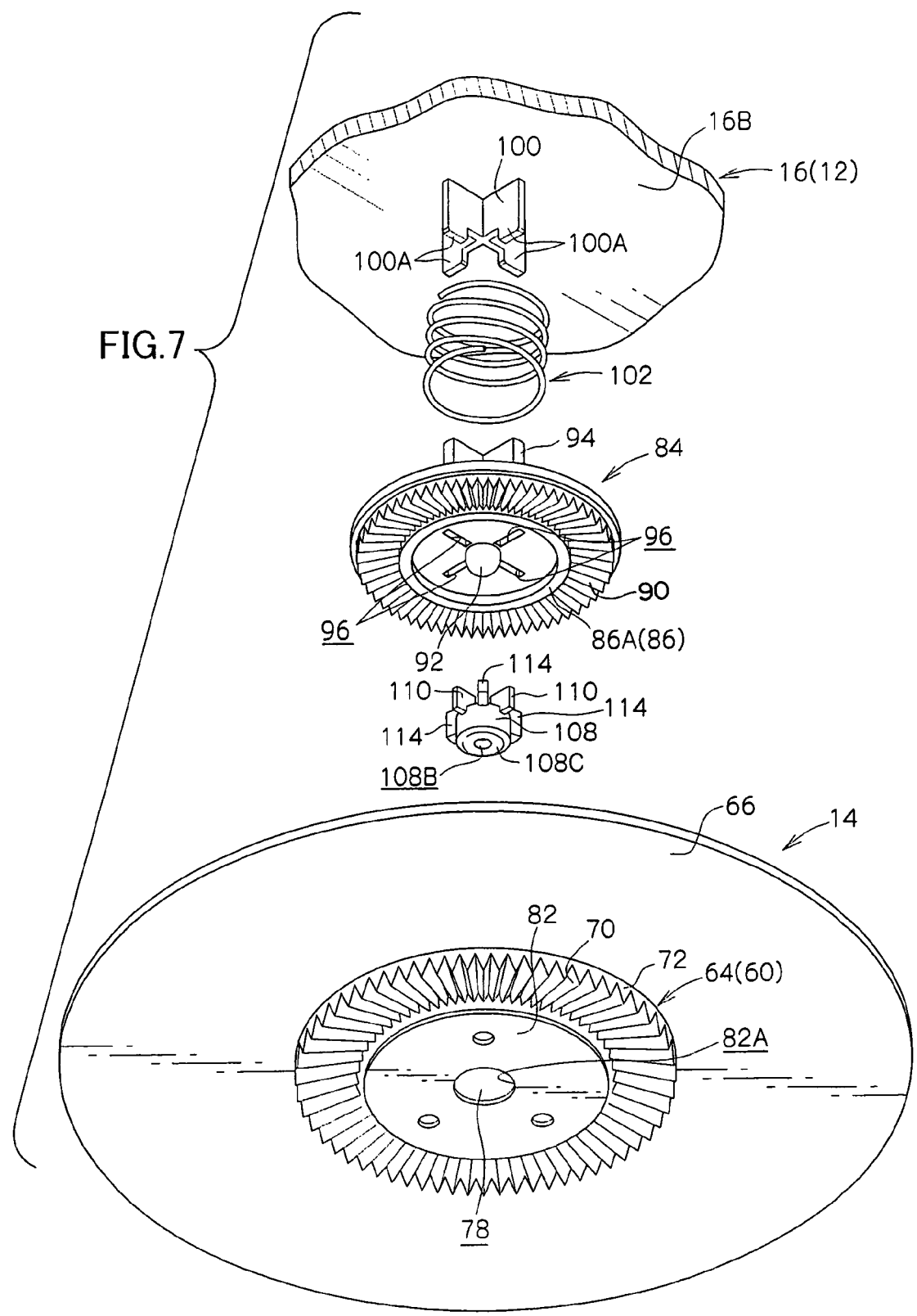
FIG. 7 is an exploded, perspective view showing the reel, the brake means, etc., of the recording tape cartridge as seen from the lower side.
Figure 10:
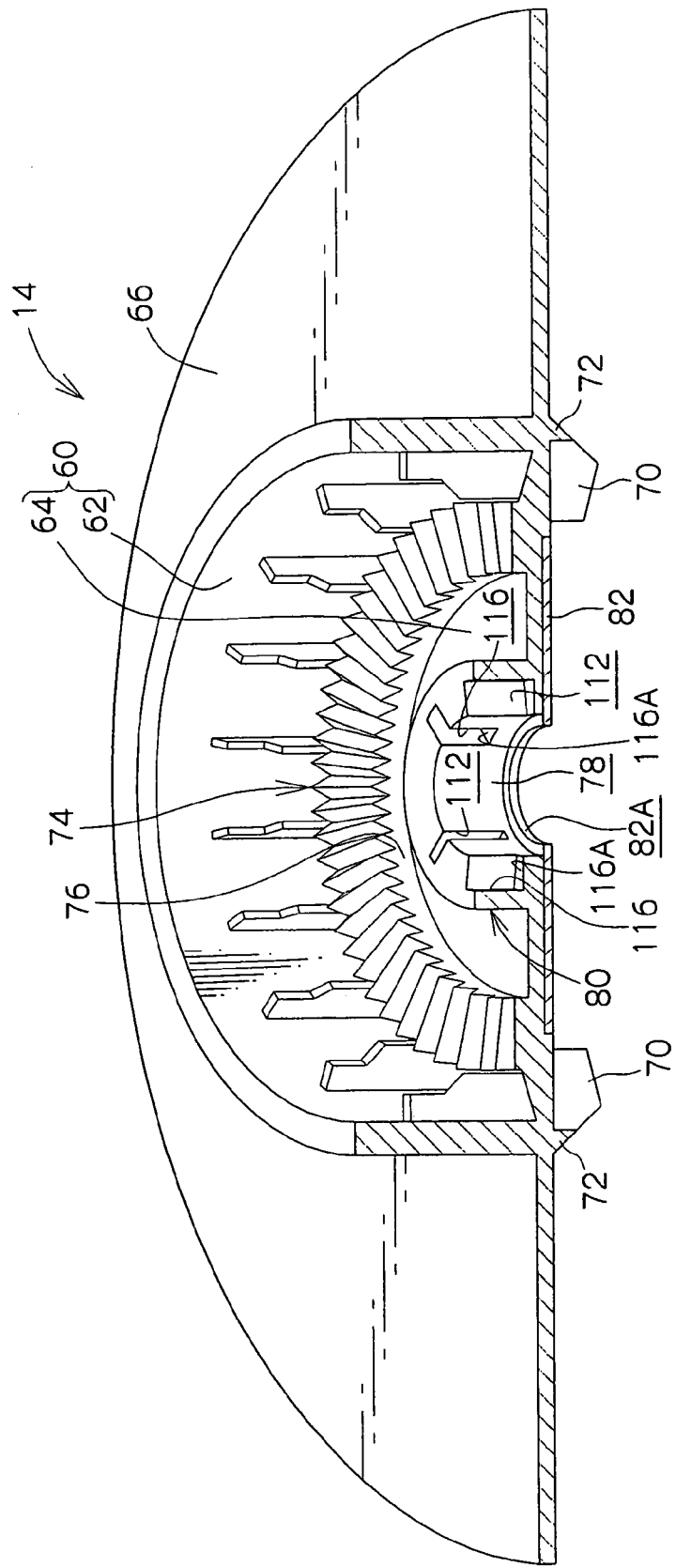
FIG. 10 is a cross-sectional, perspective view of the reel to which the clutch member is to be mounted.

As shown also in FIGS. 7 and 10, an annular reel gear 70 is formed on an outer peripheral portion of the lower surface (outer surface) of the bottom plate portion 64 of the reel hub 60 in coaxial relation to the reel 14. The reel gear 70 can mesh with a drive gear 158 formed on a rotation shaft 150 (described later) of the drive unit. Distal ends of teeth of the reel gear 70 project downwardly beyond the lower flange 66. The portion at each of these teeth on the radial outside is a tapering portion 72 which is continuous with, and connects to, the lower flange 66. This tapering portion 72 extends from a central portion at the top of the teeth to the bottom of the teeth.

As shown in FIGS. 6 and 8, an annular engagement gear 74 is formed on an upper surface (inside surface) of the bottom plate portion 64 of the reel hub 60 at an outer peripheral portion thereof in coaxial relation to the reel 14. The engagement gear 74 is formed on an annular pedestal portion 76 slightly raised from the inner surface of the bottom plate portion 64, and can mesh with a brake gear 90 of a brake member 84 (described later). A through hole 78 is formed through an axis portion (central portion) of the bottom plate portion 64 of the reel hub 60. A clutch boss 80 of a short cylindrical shape is formed upright on the upper surface of the bottom plate portion 64, and is disposed around a peripheral edge of the through hole 78. This clutch boss 80, together with the clutch member 106, will be described later.

All of the portions of the above-described reel 14 except the upper flange 68 are resin-molded into an integral construction. The annular reel plate 82, made of a magnetic material, is formed integrally in the lower surface of the bottom plate portion 64 of the reel hub 60 by insert molding, and is disposed within the reel gear 70 in coaxial relation thereto. A through hole 82A is formed through an axis portion (central portion) of the reel plate 82, and a diameter of the through hole 82A is slightly smaller than a diameter of the through hole 78.

The reel 14 is accommodated within the casing 12, and rests on the annular rib 27 when the recording tape cartridge 10 is not being used. More specifically, as shown in FIG. 8, an outer portion of the tapering portion 72 (which is disposed near to the inner edge of the lower flange 66) at the bottom plate portion 64 of the reel 14 abuts against an upper end surface of the annular rib 27. An inner edge portion of the upper end of the annular rib 27 is formed into a tapering surface 27A corresponding to the tapering portion 72, so that radial movement of the reel 14 is prevented. In this condition, the reel 14 is disposed within the casing 12 as a whole, and the reel gear 70 and the reel plate 82 are exposed to the exterior through the gear opening 26.

Figure 9:
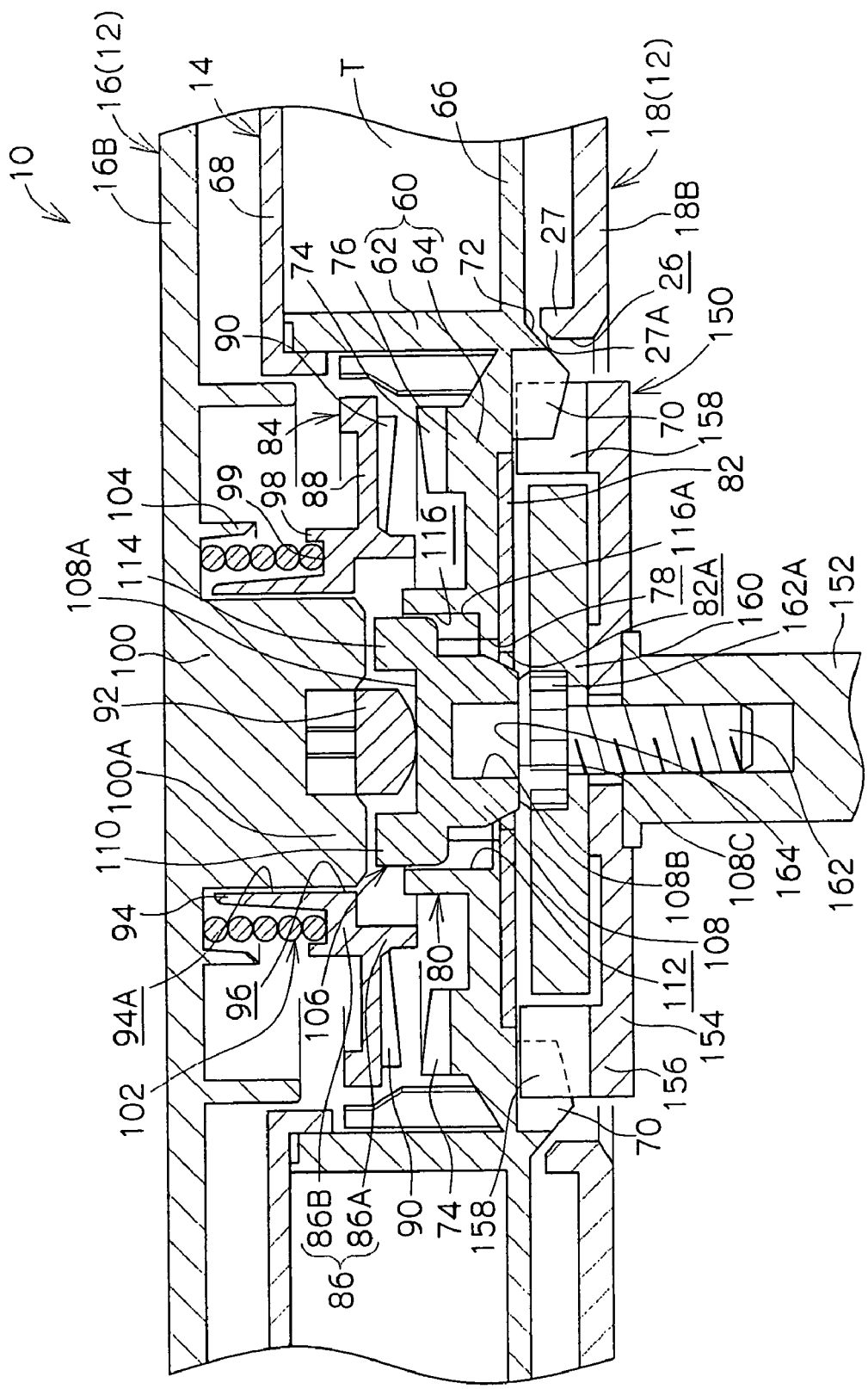
FIG. 9 is a view similar to FIG. 8, but showing a condition in which the reel can be rotated.

The recording tape cartridge 10 is provided with the braking means for preventing the rotation of the reel 14 when this cartridge 10 is not used. This braking means includes the brake member 84. As shown in FIGS. 8 and 9, the brake member 84 includes a body portion 86, and this body portion 86 has a substantially downwardly-open, closed-ended cylindrical shape. This shape is defined by a tubular portion 86A of a short cylindrical shape and a disk portion 86B closing an upper end of the tubular portion 86A. An outer diameter of the tubular portion 86A is smaller than an inner diameter of the engagement gear 74 (and an inner diameter of the pedestal portion 76), and an inner diameter of the tubular portion 86A is larger than an outer diameter of the clutch boss 80.

An annular ring portion 88 is formed on an outer peripheral surface of the body portion 86 (the tubular portion 86A) over an entire circumference thereof, and extends outwards radially from a central portion of the tubular portion 86A. The brake gear 90 is formed on a lower surface of the ring portion 88 over an entire outer peripheral portion of this lower surface. Namely, the brake gear is formed into an overall annular shape. This brake gear 90 can be brought into meshing engagement with the engagement gear 74 of the reel 14.

A pivot portion 92 is formed on and projects from a lower surface of the disk portion 86B of the body portion 86 at its axial portion (central portion), and is disposed within the tubular portion 86A. A distal end of the pivot portion 92 is formed into a substantially semi-spherical surface, and is adapted to be held generally in point-to-point contact with the clutch member 106 (described later). The distal end of the pivot portion 92 is located at a level above the lower end of the tubular portion 86A, and is disposed within the tubular portion 86A. A cross-shaped projection 94 is formed on and projects upwardly from an upper surface of the disk portion 86B, and a guide groove 94A, having a generally cross-shape when viewed from above, is formed in the cross-shaped projection 94.

Through holes 96 are formed through the disk portion 86B in a direction of the thickness thereof. The through holes 96 number 4 in total, are separated from one another, have a rectangular shape and communicate with respective outer radial portions of the cross-shaped guide grooves 94A except at the axial portion (central portion) serving as an intersecting portion (see FIG. 7). Therefore, the through holes 96 are disposed radially outwardly of the pivot portion 92 in adjoining relation thereto, and are open to the interior of the tubular portion 86A. An annular rib 98 is formed on and projects upwardly from the upper end of the body portion 86 at an outer peripheral portion thereof. A portion of the upper surface of the disk portion 86B, lying between the rib 98 and the cross-shaped projection 94, serves as a spring support surface 99 against which one end of a compression coil spring 102 abuts.

The above-described brake member 84 is mounted within the cylindrical portion 62 of the reel hub 60 in substantially coaxial relation thereto so as to be movable upward and downward in the direction of the axis of the reel 14. Namely, the brake member 84 can move vertically in the direction of the axis of the reel 14 between a position (rotation-locking position) where the brake gear 90 is disposed in meshing engagement with the engagement gear 74 of the reel hub 60 and a position (rotation-allowing position) where this meshing engagement is released. The length of the tubular portion 86A is so determined that its lower end will not abut against the bottom plate portion 64 when the brake member 84 is located in the rotation-locking position (see FIG. 8).

A cross-shaped rib 100 (see FIGS. 6 and 7), formed on and projecting downwardly from the top plate 16B of the upper casing 12, is inserted into the guide groove 94A in the cross-shaped projection 94 of the brake member 84. The cross-shaped rib 100 has such a shape as obtained when two thin plate-like pieces are connected together in perpendicularly intersecting relation to each other, and therefore this cross-shaped rib 100 has a rotation prevention shape. The cross-shaped rib 100 is engaged with the cross-shaped projection 94 (that is, with grooves walls of the guide groove 94A), thereby preventing the rotation of the brake member 84 relative to the casing 12.

With this construction, when the brake gear 90 of the brake member 84 is in mesh with the engagement gear 74 of the reel hub 60, the brake member 84 prevents the rotation of the reel 14. The cross-shaped rib 100 is kept received in the guide groove 94A during the overall stroke (upward and downward movements) of the brake member 84, and therefore also performs the function of guiding the movement of the brake member 84 in the upward and downward directions. The cross-shaped rib 100 has projecting piece portions 100A which extend from the lower end thereof, and are disposed in registry with the respective through holes 96 in the brake member 84. The width (i.e., the dimension in the radial direction of the brake member 84) of the projecting piece portions 100A is reduced to width which corresponds to the length of the through holes 96, and the projecting piece portions 100A can be inserted into the respective through holes 96.

When the brake member 84 is located in the rotation-locking position, the projecting piece portions 100A are disposed within the guide groove 94A, and when the brake member 84 is located in the rotation-allowing position, the projecting piece portions 100A are inserted in the respective through holes 96 to project from the lower surface of the disk portion 86B (that is, the projecting piece portions 100A pass through the respective through holes 96). Since the cross-shaped rib 100 has the projecting piece portions 100A extending therefrom, not only does this cross-shaped rib 100 prevents the rotation of the brake member 84 relative to the casing 12, but also the amount of engagement of the cross-shaped rib 100 with the brake member 84 (that is, the depth of insertion of the cross-shape rib 100 into the brake member 84) is much increased, thereby suppressing the tilting of the brake member 84 relative to the casing 12. Also, the cross-shaped rib 100 of this construction enhances the ability to guide the upward and downward movements of the brake member 84. In this first embodiment, the amount of engagement of the cross-shaped rib 100 (including the projecting piece portions 100A) with the brake member 84 (located in the rotation-locking position) in the axial direction is set to be sufficiently greater than the overall stroke of the brake member 84 (see FIG. 8).

The compression coil spring 102 is provided in a compressed condition between the spring support surface 99 of the brake member 84 and the top plate 16B. The compression coil spring 102 abuts at its one end against the spring support surface 99, and also abuts at the other end thereof against the top plate 16B. This end of the compression coil spring 102 is disposed within an annular wall portion 104, formed on the lower surface of the top plate 16B surrounding the cross-shaped rib 100. Therefore, the compression coil spring 102 is prevented from being radially displaced out of position.

The brake member 84 is normally urged downward by an urging force of the compression coil spring 102, so that the brake gear 90 is held in meshing engagement with the engagement gear 74, thereby positively preventing the accidental rotation of the reel 14 (that is, the brake member 84 is held in the rotation-locking position). The reel 14 which is in mesh with the brake member 84 at the engagement gear 74 is also urged downward by this urging force, and is held against the annular rib 27, and therefore is prevented from shaking within the casing 12.

As shown in FIGS. 6 to 9, the recording tape cartridge 10 is provided with the clutch member 106 which is operated from the exterior when releasing the locked condition of the reel 14 established by the brake member 84. The clutch member 106 includes a clutch body 108 of a substantially cylindrical shape. An outer diameter of the clutch body 108 is slightly smaller than the diameter of the through hole 82A in the reel plate 82 and also slightly smaller than the diameter of the through hole 78 equal to the inner diameter of the clutch boss 80.

A flat upper end surface of an axial portion of the clutch body 108 serves as a sliding contact surface 108A which is held in constant contact with the pivot portion 92 of the brake member 84. A flat lower end surface of the clutch body 108, formed around a downwardly-open lightening hole 108B, serves as an operating pressing surface 108C. When the operating pressing surface 108C is pressed, the clutch member 106 is moved upward against the urging force of the compressing coil spring 102 to bring the brake member 84 into the rotation-allowing position. Details of this operation will be described later.

The clutch member 106 has rotation-limiting ribs 110 extending radially outwardly beyond the outer peripheral surface of the clutch body 108. The plurality of rotation-limiting ribs 110 (three in this first embodiment) are provided at equal intervals in the circumferential direction of the clutch body 108, and the rotation-limiting ribs 110 are arranged in a radial manner when viewed from above. Each of the rotation-limiting ribs 110 is continuous with an outer peripheral portion around the upper end surface of the clutch body 108 above the sliding contact surface 108A and also continuous with an outer peripheral surface of the clutch body 108 disposed immediately adjacent to this upper end surface. These rotation-limiting ribs 100 project upwardly beyond the sliding contact surface 108A. Each of the rotation-limiting ribs 110 comprises a chucked portion (portion to be chucked) 120 and a rotation-limiting portion 122 (see FIGS. 11A and 11B), and this will be described later.

The rotation-limiting ribs 110 are inserted into respective rotation-limiting grooves 112 formed in the inner peripheral surface of the clutch boss 80. Namely, the three rotation-limiting grooves 112 are provided at equal intervals in a circumferential direction of the clutch boss 80. The rotation-limiting grooves 112 are upwardly open to the upper end surface of the clutch boss 80. With this construction, the clutch member 106 can be moved upward and downward while the rotation-limiting ribs 110 are guided by the respective rotation-limiting grooves 112 in the clutch boss 80. Even when the clutch member 106 is moved upward to bring the brake member 84 into the rotation-allowing position, the rotation-limiting ribs 110 are kept received respectively in the rotation-limiting grooves 112 in the clutch boss 80. With this construction, the clutch member 106 can not be rotated relative to the reel 14, and therefore always rotates together with the reel 14.

The clutch member 106 further includes seating ribs 114 separate from the rotation-limiting ribs 110, and these seating ribs 114 serves to prevent the clutch member 106 from disengagement from the reel hub 60, and also serves to hold the sliding contact surface 108A against the brake member 84 located in the rotation-locking position. The plurality of seating ribs 114 (three in this first embodiment) are provided at equal intervals in the circumferential direction of the clutch body 108 in such a manner that each of the seating ribs 114 is disposed midway between the corresponding two adjacent rotation-limiting ribs 110 in the circumferential direction. Like the rotation-limiting ribs 110, each of the seating ribs 114 is continuous with the outer peripheral portion around the upper end surface of the clutch body 108 above the sliding contact surface 108A and also continuous with the outer peripheral surface of the clutch body 108 disposed immediately adjacent to this upper end surface. The seating ribs 114 project upwardly and radiate outwards from the clutch body 108, and are arranged in a radial manner when viewed from above. Each of the seating ribs 114 comprises a chucked portion (portion to be chucked) 124 and a seating portion 126 (see FIGS. 11A and 11B), and this will be described later.

The seating-limiting ribs 114 are inserted in respective stopper grooves 116 formed in the inner peripheral surface of the clutch boss 80. Namely, the stopper grooves 116 are provided at equal intervals in the circumferential direction of the clutch boss 80 in such a manner that each of the stopper grooves 116 is disposed midway between the corresponding two adjacent rotation-limiting grooves 112 in the circumferential direction. The stopper grooves 116 are upwardly open to the upper end surface of the clutch boss 80, and are closed at their lower ends by their respective bottom portions whose upper surfaces serve as respective stopper surfaces 116A.

When the brake member 84, held at the pivot portion 92 continuously against the sliding contact surface 108A, is located in the rotation-locking position, the lower ends of the seating ribs 114 abut against (or are seated on) the respective stopper surfaces 116A.

The clutch body 108, the rotation-limiting ribs 110 and the seating ribs 114 of the clutch member 106 are resin-molded into an integral construction. As shown in FIG. 11B, the upper end surfaces of the rotation-limiting ribs 110 are disposed at the same height or level as the upper end surfaces of the seating ribs 114, but the lower end surfaces of the rotation-limiting ribs 110 are disposed at a level below the lower end surfaces of the seating ribs 114. Therefore, the upper ends of the rotation-limiting grooves 112 open to the upper end of the clutch boss 80 are disposed at the same level as the upper ends of the stopper grooves 116 open to the upper end of the clutch boss 80, but the bottom surfaces of the rotation-limiting grooves 112 are disposed at a level below the stopper surfaces 116A of the stopper grooves 116. In other words, the rotation-limiting ribs 110 are longer than the seating ribs 114 in the vertical direction (upward-downward direction), and the rotation-limiting grooves 112 are deeper than the stopper grooves 116 in the vertical direction.

With this construction, the amount of engagement of the rotation-limiting ribs 110 with the clutch boss 80 (that is, the amount of insertion of these ribs 110 into the respective rotation-limiting grooves 112) is increased so that stresses, applied from the reel 14 to the rotation-limiting ribs 110 during the rotation of the reel 14, can be relieved. Also the ability to guide the upward and downward movement of the clutch member 106 can be enhanced, and shaking of the clutch member 106 is suppressed when the brake member 84 is located in the rotation-allowing position.

Figure 11A:
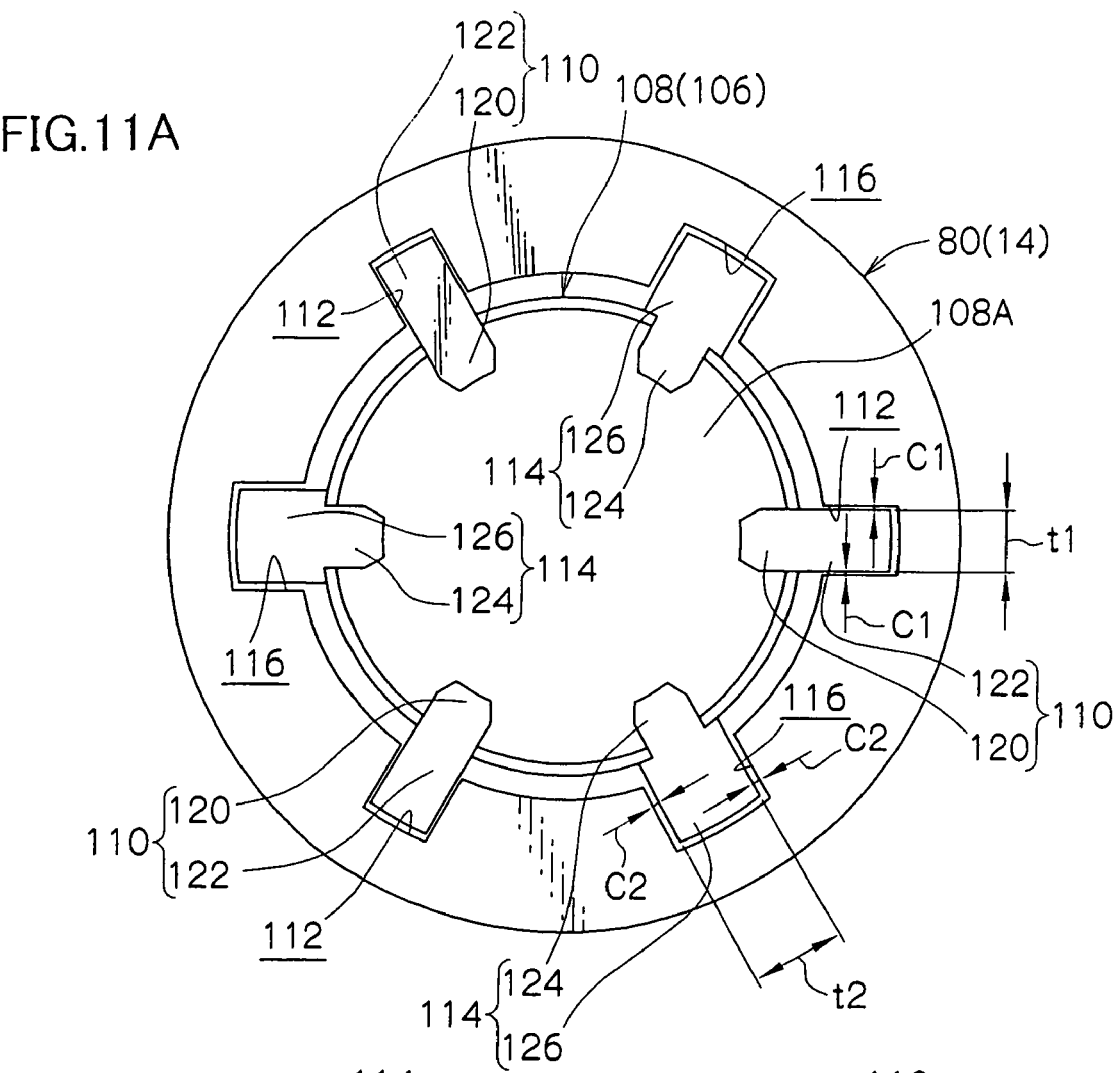
FIG. 11A is an enlarged plan view showing a condition in which the clutch member is mounted on the reel.
Figure 11B:
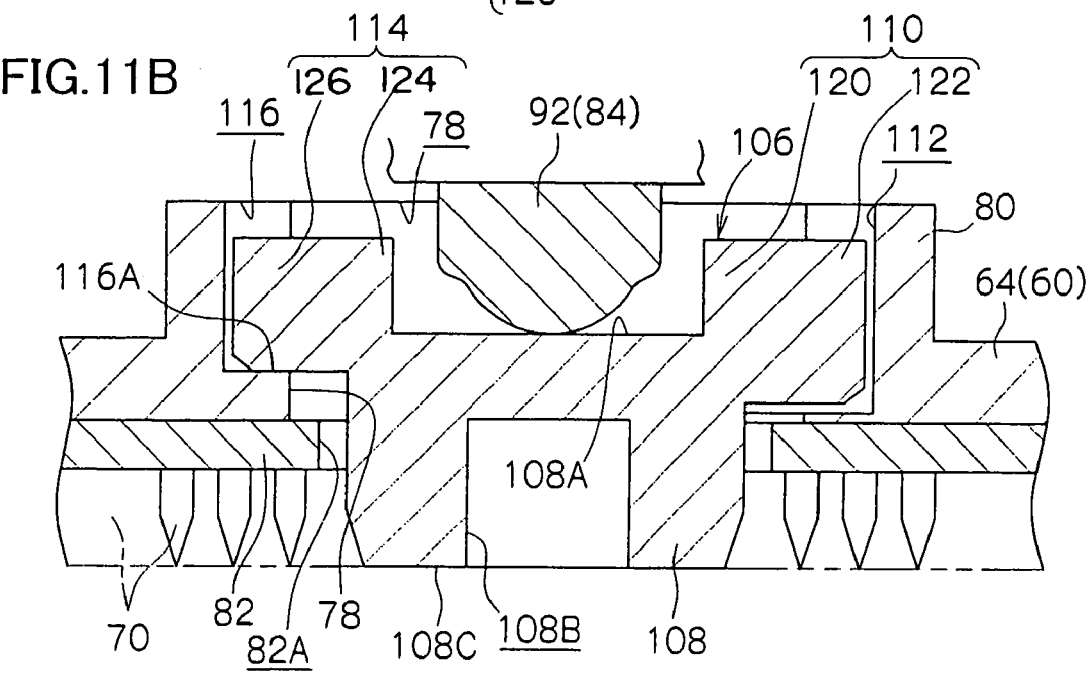
FIG. 11B is a cross-sectional view showing this condition.

As shown in FIG. 11A, in order to further suppress the above shaking, a clearance C1 between the mating side surfaces of the rotation-limiting rib 110 and rotation-limiting groove 112, opposed to each other in the circumferential direction, is made small but not so small that a sliding resistance, developing therebetween when the clutch member 106 moves upward and downward, becomes excessive. Further, the thickness (plate thickness in the circumferential direction of the clutch member 106) of the rotation-limiting rib 110 is reduced to such a degree that the strength thereof will not be adversely affected, and the resin-molding is carried out with high dimensional accuracy. With this construction, the clearance C1 can be made sufficiently small. In this first embodiment, the thickness t1 of the rotation-limiting rib 110 is 1.5 mm, and the clearance C1 is 0.05 mm.

On the other hand, the seating rib 114 is larger in thickness than the rotation-limiting rib 110. Therefore, the seating rib 114 has sufficient rigidity that the seating rib 114, when seated on the stopper surface 116A, can withstand the urging force of the compression coil spring 102 acting thereon through the brake member 84. Also, since the stopper grooves 116 are shallow, those portions of the bottom plate portion 64 (of the reel hub 60), forming the respective stopper surfaces 116A (on which the respective seating ribs 114 can be seated), are thickened, and therefore have sufficient rigidity to withstand the urging force of the compression coil spring 102.

The seating ribs 114 are thick, and therefore the flowability of the resin during molding is relatively bad. However, since the seating ribs 114 are shorter than the rotation-limiting ribs 110 as described above, the molded seating ribs 114 are less liable to be affected by bad flowability (effects of flowability are less liable to be exerted on other portions). Besides, the seating ribs 114 which are thickened, are of a lesser dimensional accuracy to the rotation-limiting ribs 110 since they are not required to have the function of suppressing the shaking of the clutch member 106, and a clearance C2 between the mating side surfaces of the seating rib 114 and stopper groove 116, opposed to each other in the circumferential direction, is sufficiently larger than the clearance C1. Therefore, a sliding resistance will not be produced between the seating ribs 114 and the clutch boss 80 during the upward and downward movement of the clutch member 106, or the development of such a sliding resistance will be markedly suppressed. In this first embodiment, the thickness t2 of the seating rib 114 is 2 mm, and the clearance C2 is 0.1 mm.

The rotation-limiting ribs 110 of the above-described clutch member 106 are inserted into the respective rotation-limiting grooves 112, while the seating ribs 114 are inserted into the respective stopper grooves 116, and in this condition the clutch body 108 is passed through the through hole 78 and the through hole 82A. The seating ribs 114 are normally held respectively against the stopper surfaces 116A by the urging force of the compression coil spring 102 acting on the clutch member 106 through the brake member 84. In this condition, the respective lower end surfaces of the rotation-limiting ribs 110 are slightly spaced from the bottom surfaces of the rotation-limiting grooves 112 (see FIG. 11B). With respect to the position of the operating pressing surface 108C in the vertical direction, this operating pressing surface 108C is disposed at a level slightly (0.1 mm in this first embodiment) above the distal ends of the teeth of the reel gear 70.

In accordance with the meshing engagement of the reel gear 70 with the drive gear 158 formed on the rotation shaft 150 of the drive unit, the clutch member 106 is pressed by a pressing portion 164 of the rotation shaft 150, and is moved upward. First, the rotation shaft 150 will be described. The rotation shaft 150 includes: a rotary shaft portion 152; a disk-shaped rotation table 154, fixedly secured to an upper end of the rotary shaft portion 152; the drive gear 158, which is formed on an upper surface of an annular rib 156 formed on and projecting upwardly from an upper surface of the rotation table 154 at an outer peripheral portion thereof, and being able to mesh with the reel gear 70; a magnet 160, which is fixed to the rotation table 154, and is disposed within the annular rib 156; and a bolt 162, which passes through the magnet 160 and the rotation table 154, and is threaded into the rotary shaft portion 152. The amount of projection of a bolt head 162A can be adjusted in accordance with the amount of threading of the bolt 162 into the rotary shaft portion 152, and an upper surface of this head 162A serves as the pressing portion 164.

When the recording tape cartridge 10 is loaded into the drive unit, this recording tape cartridge 10 is moved downward toward the rotation shaft 150. As a result, the drive gear 158 of the rotation shaft 150 meshes with the reel gear 70 exposed through the gear opening 26, and also the reel plate 82 is attracted by the magnet 160 of the rotation shaft 150, and is kept spaced slightly from the magnet 160, so that the reel 14 is held by the rotation shaft 150.

In accordance with this meshing operation, the rotation shaft 150 moves upward relative to the casing 12, so that the pressing portion 164 presses the operating pressing portion 108C of the clutch member 106 to move the clutch member 106 upward, thereby moving the brake member 84 into the rotation-allowing position. Therefore, in accordance with the meshing engagement of the drive gear 158 with the reel gear 70, the reel 14 levitates within the casing 12 against the urging force of the compression coil spring 102 (that is, the lower flange 66 is separated from the annular rib 27). Also the rotation-preventing condition of the reel 14, established by the brake member 84, is released, so that the reel 14 can rotate within the casing 12.

When the reel gear 70 is in mesh with the drive gear 158, the operating pressing portion 108C of the clutch member 106 is held in abutting engagement with the pressing portion 164, thereby holding the brake member 84 in the rotation-allowing position. When the reel 14 is rotated, there is no relative rotation between the clutch member 106 (rotating together with the reel 14) and the rotation shaft 150 for driving the reel 14. Thus, the operating pressing surface 108C is disposed in non-sliding contact with the pressing surface 164, and the sliding contact surface 108A of the clutch member 106 is held in sliding contact with the pivot portion 92 of the brake member 84 which can not rotate relative to the casing 12.

(Grasping Structure of Clutch Member)

The above-described clutch member 106 is mounted on the clutch boss 80 of the reel 14 by an automatic assembling apparatus. The grasping device of the automatic assembling apparatus grasps the clutch member 106, with its grasping portions abutting against the respective rotation-limiting rib 110 and the respective seating rib 114 arranged symmetrically with respect to the axis C of the clutch body 108. This will be described more specifically.

Figure 1A:
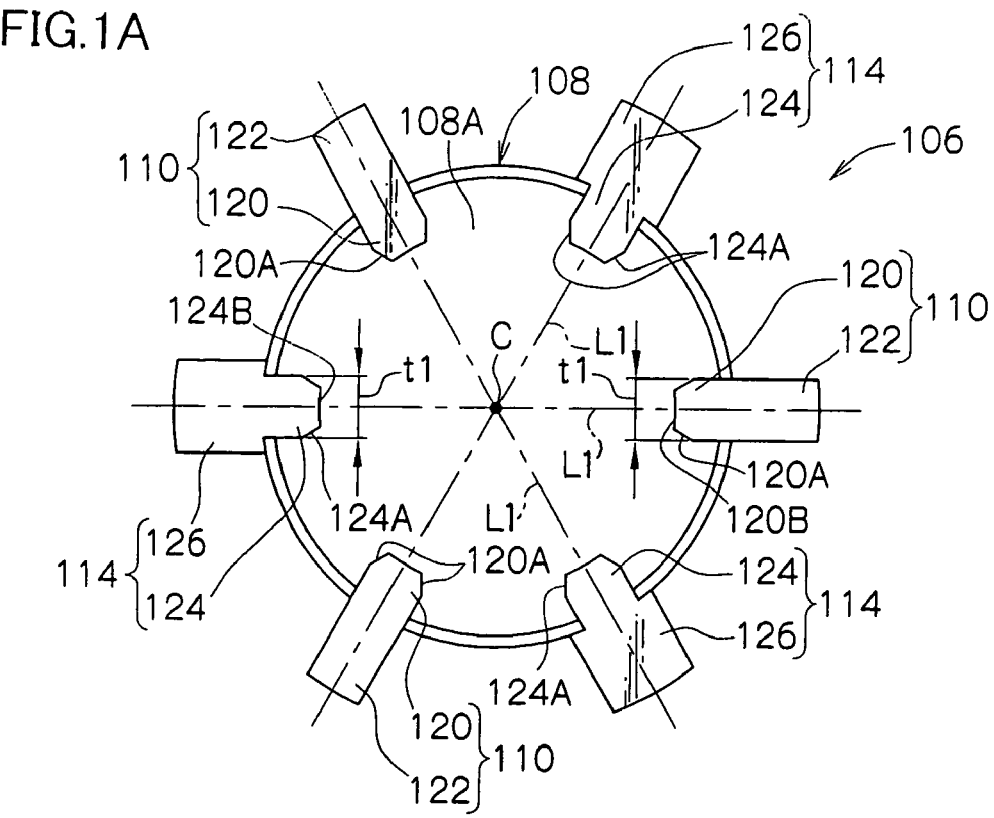
FIG. 1A is a plan view of a first embodiment of a structure to be grasped of the invention, as applied to a clutch member.

As shown in FIG. 1(A), each rotation-limiting rib 110 and the seating rib 114, disposed in symmetrical relation to each other with respect to the axis C of the clutch body 108, are disposed on an imaginary straight line L1 (coinciding with a diametrical line) passing through the axis C of the clutch body 108, and these ribs are elongated along the imaginary straight line L1 when viewed from above.

Each rotation-limiting rib 110 (which is smaller in thickness than the seating rib 114 as described above) has the uniform thickness t1 (width in a direction perpendicular to the longitudinal direction) over the entire length thereof, and has a substantially rectangular shape when viewed from above. That portion of the rotation-limiting rib 110, disposed on the upper side of the clutch body 108, that is, projecting from the upper end surface of the clutch body 108, serves as the chucked portion 120, while that portion of the rotation-limiting rib 110, extending radially outwardly from the outer periphery of the clutch body 108, serves as the rotation-limiting portion 122 for being inserted into the rotation-limiting groove 112.

Similarly, that portion of each seating rib 114, disposed on the upper side of the clutch body 108, that is, projecting from the upper end surface of the clutch body 108, serves as the chucked portion 124, while that portion of the seating rib 114, extending radially outwardly from the outer periphery of the clutch body 108, serves as the seating portion 126 for being inserted into the stopper groove 116. As described above, the seating portion 126 has the thickness t2 (width perpendicular to the longitudinal direction) necessary for functional reasons. On the other hand, the chucked portion 124 is formed into substantially the same shape as that of the chucked portion 120 of the rotation-limiting rib 110, and is disposed in symmetrical relation to the corresponding chucked portion 120 with respect to the axis of the clutch body 108. Namely, each chucked portion 124 has a thickness t1, and the distance between its end surface 124B and the axis C is equal to the distance between the end surface 120B of the chucked portion 120 and the axis C.

Chamfered portions 120A, 124A for smoothly fitting a chuck member 128 (described later) on the chucked portion 120, 124 are formed at that end of each chucked portion 120, 124 disposed closest to the axis C of the clutch body 108. The chamfered portions 120A and the chamfered portions 124A can be different in size from each other. Instead of forming the chamfered portions 120A and 124A, the corner portions of the end of each chucked portion or the whole of the end of each chucked portion can be formed into an arcuate or substantially-rounded shape.

Figure 1B:
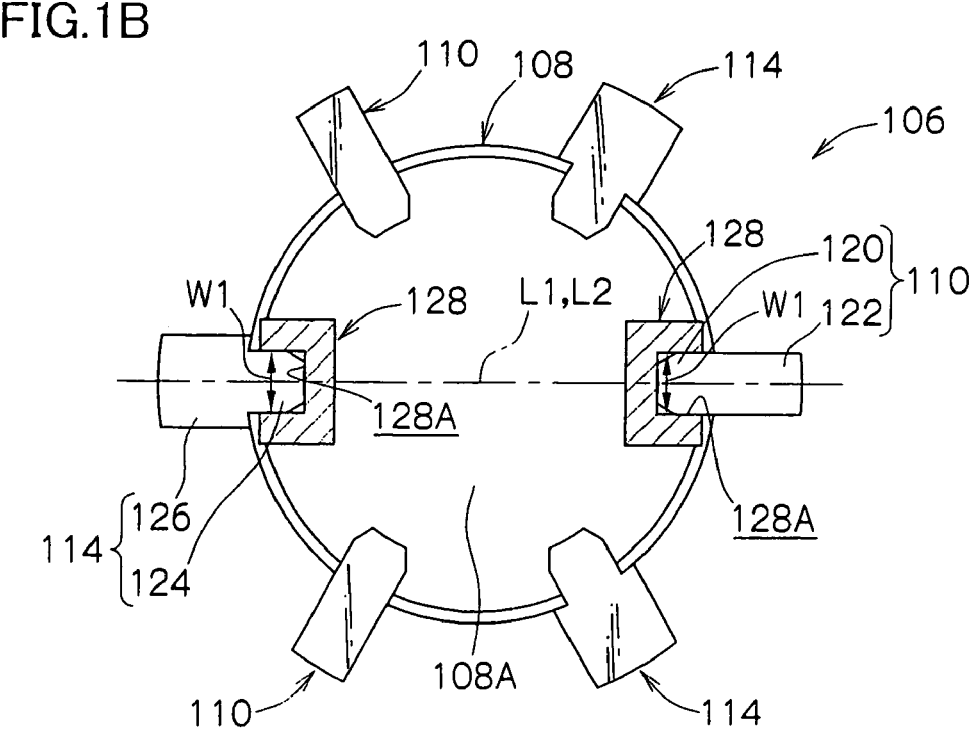
FIG. 1B is a plan view showing the clutch member grasped by chuck members in a chuck configuration.

As shown in FIG. 1B, the above-described clutch member 106 can be grasped by the pair of chuck members 128 of the grasping device. Each of the chuck members 128 has a generally U-shaped cross-section, and includes a grasping recess 128A. Each grasping recess 128A has a width w1 slightly larger than the thickness t1 of the chucked portions 120 and 124. The pair of chuck members 128 are arranged, with open ends of their grasping recesses 128A facing away from each other, and can be moved toward and away from each other (relative movement) along a common imaginary straight line L2. One of the pair of chuck members 128 can be a movable member, or both can be movable members.

Therefore, when the clutch member 106 is to be grasped or held by the grasping device, first, the pair of chuck members 128, having substantially the same configuration, are located between the chucked portions 120 and 124 disposed on the common imaginary straight line L1, and the imaginary straight line L2 is caused to coincide with the imaginary straight line L1. In this condition the pair of chuck members 128 are moved away from each other (relative movement) to fit the grasping recesses 128A on the respective chucked portions 120 and 124, thereby grasping or holding the clutch member 106.

In this grasped condition, the end surfaces 120B and 124B of the chucked portions 120 and 124 abut against respective bottom surfaces of the grasping recesses 128A, and also both side surfaces of each chucked portion 120, 124 are held in sliding contact with opposed inner side surfaces of the grasping recess 128A. Thus, if the fact that the width w1 of the grasping recess 128A is slightly larger than the thickness t1 of the chucked portion 120, 124 is ignored, the chucked portion 120, 124 is contacted at three of its surfaces with the chuck member 128. With this construction, the clutch member 106 can be positively grasped by the grasping device.

The grasping device, having the pair of chuck members 128, is mounted at a distal end of a robot arm or an actuator of an automatic assembling apparatus. This robot arm or the like is operated to mount the clutch member 106, grasped by the grasping device, on the clutch boss 80 of the reel 14. Namely, the clutch body 108 is inserted into the through holes 78 and 82A, and at the same time the rotation-limiting portions 122 of the rotation-limiting ribs 110 are inserted into the respective rotation-limiting grooves 112, while the seating portions 126 of the seating ribs 114 are inserted into the respective stopper grooves 116 (see FIGS. 11A and 11B).

The above-described clutch member 106 corresponds to "member" in the invention. Also, the clutch body 108 corresponds to "body portion", the rotation-limiting rib 110 and the seating rib 114, disposed on the common imaginary straight line L1, correspond to "set of two projecting portions", one of the chucked portions 120 and 124 corresponds to "first grasped portion (portion to be grasped)" while the other corresponds to "second grasped portion (portion to be grasped)", and one of the rotation-limiting portion 122 and the seating portion 126 corresponds to "first function portion" while the other corresponds to "second function portion". Further, the rotation-limiting groove 112 in the reel 14 corresponds to "first groove" or "second groove", and the stopper groove 116 corresponds to "second groove" or "first groove".

The pair of chuck members 128, each having the grasping recess 128A, correspond to "pair of grasping portions" in the invention.

Next, the operation of this first embodiment will be described.

When the recording tape cartridge 10 of the above construction is not being used (for example, during storage or transport), the door 50 closes the opening 20 under the urging force of the coil spring 56, with its distal end portion received in the recesses 30A. The brake member 84 is located in the rotation-locking position under the urging force of the compression coil spring 102, so that the brake gear 90 is in mesh with the engagement gear 74. Therefore, the reel 14 is prevented from rotation relative to the casing 12. At this time, the reel gear 70 of the reel 14 is exposed to the exterior through the gear opening 26, and also the clutch body 108 of the clutch member 106 projects through the through holes 78 and 82A to be exposed to the gear opening 26.

When the magnetic tape T is to be used, the recording tape cartridge 10 is loaded into a bucket (not shown) of the drive unit in the direction of arrow A. In accordance with this loading operation, the engagement projection 140, fixed to the bucket, engages the operating projection 52 of the door 50, so that the door 50 is angularly moved in a substantially rearward direction to open the opening 20. Then, when the recording tape cartridge 10 is loaded to a predetermined depth in the bucket, the bucket moves downward, and the rotation shaft 150 of the drive unit approaches the gear opening 26 (moves upward) of the casing 12 to hold the reel 14. More specifically, the rotation shaft 150 attracts the reel plate 82 by the magnet 160, and holds this reel plate 82 in a non-contact manner, with the drive gear 158 meshed with the reel gear 70.

Along with the meshing engagement of the reel gear 70 with the drive gear 158, there is an axial movement (relative movement) of the rotation shaft 150 toward the casing 12. Accordingly the pressing portion 164 of the rotation shaft 150 abuts against the operating pressing surface 108C of the clutch member 106, and moves the clutch member 106 upward against the urging force of the compression coil spring 102. As a result, the brake member 84, held at the pivot portion 92 against the clutch member 106, is also moved upward, so that the meshing engagement of the brake gear 90 of the brake member 84 with the engagement gear 74 is released. Namely, the brake member 84 reaches a relative rotation-allowing position with respect to the reel 14.

When the rotation shaft 150 moves further upward relative to the casing 12, the reel 14, together with the clutch member 106 and the brake member 84, are lifted upward (while not changing their relative positions) against the urging force of the compression coil spring 102. Thus the brake member 84 reaches the absolute rotation-allowing position (relative to the casing 12), as the lower flange 66 is moved apart from the annular rib 27 (the tapering surface 27A). As a result, the reel 14 levitates within the casing 12, and can be rotated in a non-contact relationship to the inner surface of the casing 12.

When the bucket moves downward, the recording tape cartridge 10 is positioned within the drive unit, and in this condition the drawing means of the drive unit draws the leader pin 22 from the opened opening 20, and brings it into a take-up reel of the drive unit. Then, when the drive unit drives the take-up reel and the reel 14 (the rotation shaft 150) to rotate the two in a synchronized manner, the magnetic tape T is drawn out of the casing 12, and is wound on the take-up reel, and information is recorded or reproduced by a recording/reproducing head or the like provided along a predetermined path of travel of the magnetic tape.

When the magnetic tape T is rewound on the reel 14, and the leader pin 22 is held by the pin holders 24, the bucket, having the recording tape cartridge 10 loaded therein, is moved upward. As a result, the meshing engagement of the reel gear 70 with the drive gear 158 is released, and also the abutting engagement of the pressing portion 164 with the operating pressing portion 108C of the clutch member 106 is released as the clutch member 106, together with the brake member 84, is moved downward by the urging force of the compression coil spring 102 while the two members 106 and 84 are kept in contact with each other.

As a result, the seating ribs 114 of the clutch member 106 are brought into abutting engagement with the respective stopper surfaces 116A, and also the brake gear 90 of the brake member 84 is brought into meshing engagement with the engagement gear 74. Namely, the brake member 84 is returned to the rotation-locking position where the brake member 84 prevents the rotation of the reel 14 relative to the casing 12. When the brake member 84 and the clutch member 106 are moved by the urging force of the compression coil spring 102, the reel 14 is also moved downward, and is returned to its initial condition in which the lower flange 66 abuts against the annular flange 27, with the reel gear 70 exposed to the exterior through the gear opening 26. In this condition, the recording tape cartridge 10 is unloaded from the bucket.

When the clutch member 106 is mounted on the reel 14 of the recording tape cartridge 10, the pair of chuck members 128 of the grasping device of the automatic assembling apparatus are located between the rotation-limiting rib 110 and the seating rib 114 of the clutch member 106, with the imaginary straight line L2 coinciding with the imaginary straight line L1. Then, the pair of chuck members 128 are moved away from each other. As a result, the chucked portion 120 of the rotation-limiting rib 110 is fitted into the grasping recess 128A of one chuck member 128, while the chucked portion 124 of the seating rib 114 is fitted into the grasping recess 128A of the other chuck member 128. The end surfaces 120B and 124B of the chucked portions 120 and 124 abut against the bottom surfaces of the respective grasping recesses 128A, so that the clutch member 106 is grasped or held by the grasping device. In this condition, both side surfaces of the chucked portion 120, 124 are disposed in contact with (or in close proximity to) the opposed side surfaces of the respective grasping recess 128A, and therefore the clutch member 106 will not be displaced relative to the chuck members 128 (the grasping device).

The robot arm or the actuator, having the grasping device mounted at the distal end thereof, conveys the clutch member 106 to a rotational position recognition apparatus, and then rotates the grasping device together with the clutch member 106 (if necessary) in accordance with results of the recognition, and then sets the clutch member 106 in a predetermined rotational position so that the clutch member 106 can be mounted on the reel 14. The rotational position recognition apparatus utilizes, for example, an image processing technique. Thereafter, the robot arm or the actuator brings the clutch member 106 toward the clutch boss 80, with the axis of the clutch member 106 coinciding with the axis of the reel 14. As a result, the clutch body 108 is inserted into the clutch boss 80, and extends through the through holes 78 and 82A, and also the rotation-limiting portions 122 of the rotation-limiting ribs 110 are inserted into the respective rotation-limiting grooves 112 while the seating portions 126 of the seating ribs 114 are inserted into the respective stopper grooves 116. Then, when the lower end surfaces of the seating portions 126 are brought into abutting engagement with the stopper surfaces 116A, respectively, the mounting of the clutch member 106 on the reel 14 is completed. Then, after the rotation-limiting portions 122 and the seating portions 126 are inserted respectively in the corresponding rotation-limiting grooves 112 and stopper grooves 116 to predetermined amounts, the chuck members 128 of the grasping device are moved toward each other, thereby canceling the grasping of the clutch member 106, and the grasping device is prepared for the next grasping operation.

The rotation-limiting rib 110 and the seating rib 114 which have different shapes because of their different functions have respective chucked portions 120 and 124 of substantially the same shape, and therefore the grasping device can grasp the clutch member 106 by the pair of chuck member 128 of the same shape without displacing the clutch member 106 along the imaginary straight line L1. Therefore, whichever of the chucked portion 120 and the chucked portion 124 is located so as to be fitted into one chuck member 128 at the time of effecting the grasping operation, the clutch member 106 can be grasped by the grasping device. Namely, the clutch member 106, located in a rotational position angularly spaced 180 degrees relative to the rotational position of the clutch member 106 shown in FIG. 1B, can also be positively grasped by the grasping device.

In this embodiment in which the three pairs of rotation-limiting ribs 110 and seating ribs 114 are provided, there are six graspable positions for the clutch member 106 which are angularly spaced an angle of 60° from one another. Therefore, before effecting the grasping operation by the grasping device, the clutch member 106 need only to be located in any of the six graspable positions per rotation of the clutch member 106, and therefore the degree of freedom for positioning is high. Therefore, the efficiency of the assembling operation for mounting the clutch member 106 on the reel 14 by the automatic assembling apparatus is high.

As described above, in the recording tape cartridge 10 to which the structure to be grasped of this first embodiment is applied, the clutch member 106 can be grasped by a pair of chuck members 128 having respective grasping recesses 128A of the same shape.

And besides, the chucked portions 120, 124 have a substantially rectangular shape when viewed from above, and three surfaces (i.e., the end surfaces 120B, 124B and both side surfaces) thereof are contacted with the inner surface of the grasping recess 128A, and therefore the clutch member 106 is positively prevented from displacement (movement) in the imaginary straight line L1 and a direction perpendicular to the imaginary straight line L1 with respect to the chuck member 128, that is, the grasping device. Therefore, the clutch member 106 can be positively mounted on the clutch boss 80 without interference therewith.

Furthermore, the chucked portions 120 and the chucked portion 124 are formed respectively at those portions of the rotation-limiting rib 110 and seating rib 114 which are disposed close to the axis C of the clutch body 108, and the clutch member 106 is grasped by the pair of chuck member 128 from the direction of the axis C, and therefore in the grasped condition, the pair of chuck members 128 hardly project from the region defining the outer shape of the clutch member 106 when viewed from above (see FIG. 1B). Therefore, when mounting the clutch member 106 on the reel 14, the chuck members 128 are prevented from interfering with the cylindrical portion 62 of the reel hub 60 and the clutch boss 80. Therefore, the degree of freedom for the path of conveyance of the clutch member 106 by the robot arm or the like is enhanced, and also there is no need to provide the reel 14 with a relief portion for preventing the above interference.

Particularly in this first embodiment, the rotation-limiting portion 122 (of each rotation-limiting rib 110) and the seating portion 126 (of each seating rib 114), projecting radially outwardly from the clutch body 108, are inserted respectively in the rotation-limiting groove 112 and the stopper groove 116. However, the chuck members 128 will not interfere with the clutch boss 80 (that is, the rotation-limiting portions 122 and the seating portions 126) as described above, and therefore the chuck members 128 can positively insert the rotation-limiting portions 122 and the seating portions 126 respectively into the corresponding rotation-limiting grooves 112 and seating grooves 114. In this first embodiment, the clutch member 106 can be kept grasped by the pair of chuck members 128 until the seating portions 126 are brought into abutting engagement with the respective stopper surfaces 116A.

And besides, each chucked portion 120 and each chucked portion 124 are formed integrally with the rotation-limiting portion 122 and the seating portion 126 respectively, which perform the rotation-limiting function and the seating function of the recording tape cartridge 10 respectively. In other words, the chucked portions 120 and 124 are not provided separately therefrom so as to be grasped by the chuck members 128. Therefore, the provision of the chucked portions 120 and 124 will not make the construction of the clutch member 106 complicated. Namely, the chuck structure is formed, effectively utilizing the rotation-limiting ribs 110 and seating ribs 114 which are necessary for the functions of the recording tape cartridge 10.

Second Embodiment

Next, a second embodiment of a structure to be grasped of the invention will be described. Those parts and portions basically identical to those of the first embodiment will be designated by identical reference numerals, and explanation thereof will be omitted.

Figure 12A:
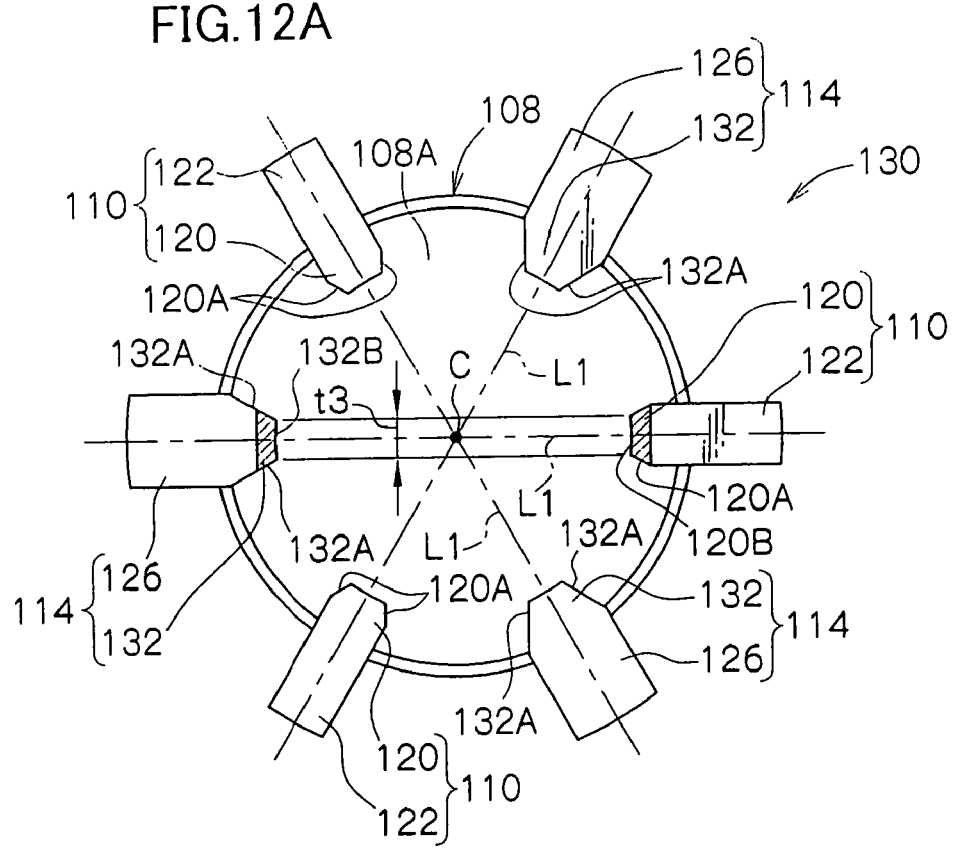
FIG. 12A is a plan view of a clutch member to which a second embodiment of a structure to be grasped of the invention is applied.

FIG. 12A is a plan view showing a clutch member 130 to which the structure to be grasped of this second embodiment is applied. Namely, in this second embodiment, also, the structure to be gtrasped is applied to a recording tape cartridge 10. The clutch member 130 is similar to the clutch member 106 in that it includes a clutch body 108, three rotation-limiting ribs 110 and three seating ribs 114, but differs from the clutch member 106 in that instead of the chucked portions 124, chucked portions 132 are provided.

The chucked portion 132 of each seating rib 114 decreases in thickness gradually from a boundary between a seating portion 126 and the chucked portion 132 toward a distal end thereof, that is, toward an axis C. This gives the chucked portion 132 a substantially trapezoidal shape when viewed from above. The chucked portion 132 is formed symmetrically with respect to an imaginary straight line L1, and the angle of each of two slanting sides 132A, relative to the imaginary straight line L1, is equal to the angle of each of chamfered portions 120A of a chucked portion 120, relative to the imaginary straight line L1. A thickness of the chucked portion 132 at its end surface 132B on the side of the axis C is equal to a thickness t3 of the chucked portion 120 at its end surface 120B on the side of the axis C.

With this construction, the distal end portions of the chucked portions 132 and 120 on the side of the axis C (indicated by hatching in FIG. 12A) have substantially the same substantially trapezoidal shape as each other when viewed from above. The distance between the axis C and the clutch body 108 and the end surface 120B of each chucked portion 120 is equal to the distance between the axis C and the end surface 132B of each chucked portion 132. In the following description, the surface of the chucked portion 132 which includes the slanting side 132A will sometimes be referred to as an abutment surface 132A, and the chambered portion 120A of the chucked portion 120 will sometimes be referred to as the abutment surface 120A.

Figure 12B:
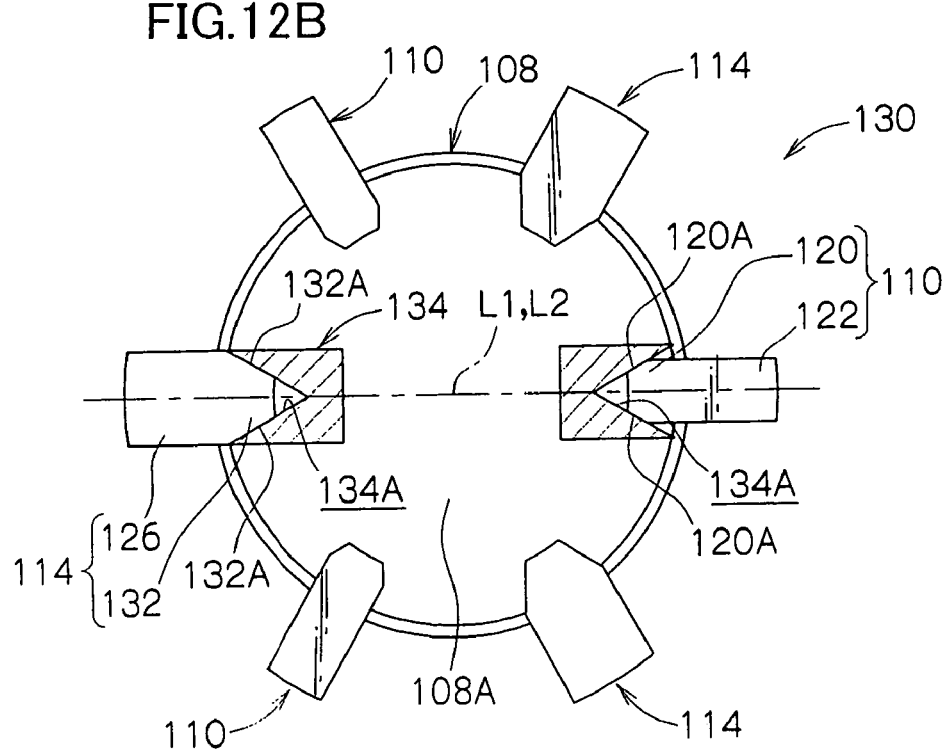
FIG. 12B is a plan view showing the clutch member grasped by chuck members.
Figure 13:
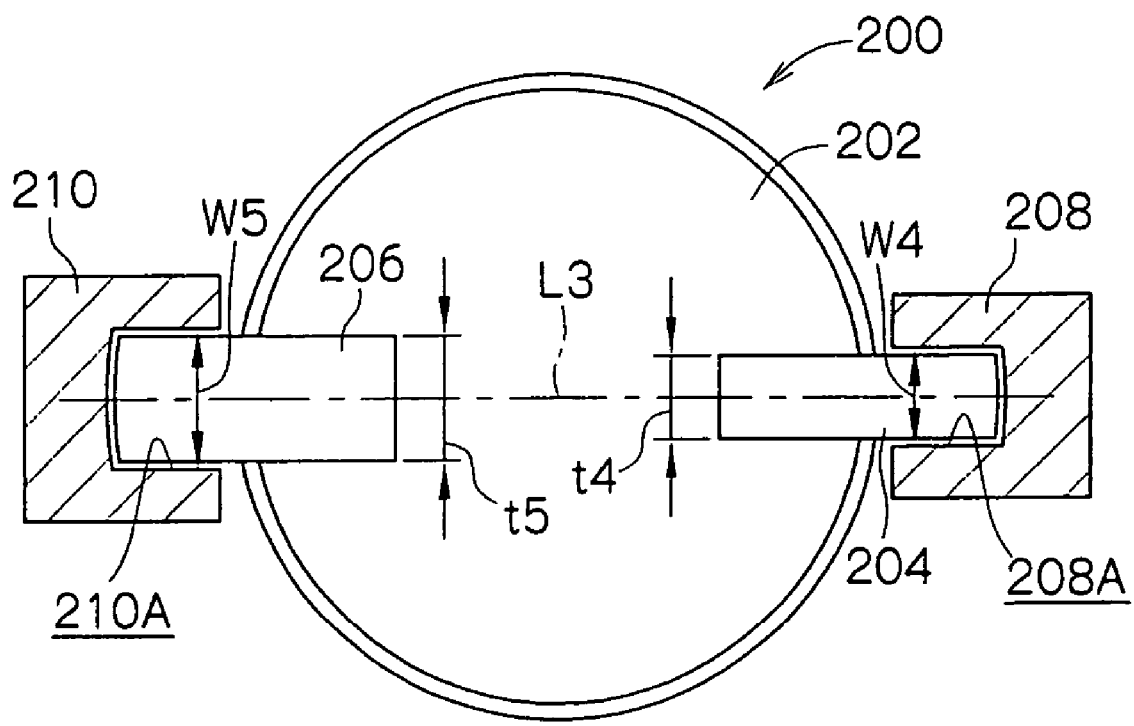
FIG. 13 is a plan view of an inefficient structure to be grasped.

As shown in FIG. 12B, the above-described clutch member 130 can be grasped by a pair of chuck members 134 of a grasping device. Each of the chuck member 134 has a grasping recess 134A of a tapering shape. A width of an open end of each grasping recess 134A is larger than the above thickness t3 (in this embodiment, this width is substantially equal to a thickness t2 of the seating portion 126), and the taper angle of the grasping recess 134A is generally equal to an angle formed by the pair of abutment surfaces 120A and also to an angle formed by the pair of abutment surfaces 132A, and the grasping recess 134A has a generally triangular shape when viewed from above. The pair of chuck members 134 are arranged, with the open ends of their grasping recesses 134A facing away from each other, and can be moved toward and away from each other (relative movement) along a common imaginary straight line L2. One of the pair of chuck members 134 can be a movable member, or both can be movable members.

Therefore, when the clutch member 130 is to be grasped or held by the grasping device, first, the pair of chuck members 134, having substantially the same configuration, are located between the chucked portions 120 and 132 disposed on the common imaginary straight line L1, and the imaginary straight line L2 is caused to coincide with the imaginary straight line L1. In this condition the pair of chuck members 134 are moved away from each other (relative movement) to fit the grasping recesses 134A respectively on the chucked portions 120 and 132, thereby grasping or holding the clutch member 130. In this grasped condition, the abutment surfaces 120A of the chucked portion 120 abut against the tapering surface of the grasping recess 134A, while the abutment surfaces 132A of the chucked portion 132 abut against the tapering surface of the grasping recess 134A. Namely, each chucked portion 120, 132 contacts a chuck member 134 at two different surfaces extending respectively in different directions intersecting the imaginary straight line LI. With this construction, the clutch member 130 can be positively grasped by the grasping device. The grasping device, having the pair of chuck members 134, is mounted on a distal end of a robot arm or an actuator as in the first embodiment.

The above-described clutch member 130 corresponds to "member" in the invention. One of those trapezoidal portions of the chucked portions 120 and 132, indicated by hatching in FIG. 12A, corresponds to "first grasped portion (portion to be grasped)", while the other corresponds to "second grasped portion (portion to be grasped)". Each of the pair of chuck members 134, having the respective grasping recesses 134A, correspond respectively to "grasping portion" in the invention.

When the clutch member 130 is mounted on the reel 14 of the recording tape cartridge 10, the pair of chuck members 134 of the grasping device are located between a rotation-limiting rib 110 and a seating rib 114 of the clutch member 130, with the imaginary straight line L2 coinciding with the imaginary straight line L1. Then, the pair of chuck members 134 are moved away from each other. As a result, the chucked portion 120 of the rotation-limiting rib 110 is fitted into the grasping recess 134A of one chuck member 134, while the chucked portion 132 of the seating rib 114 is fitted in the grasping recess 134A of the other chuck member 128. The abutment surfaces 120A of the chucked portion 120 abut against the tapering surface of the corresponding grasping recess 134A, while the abutment surfaces 132A of the chucked portion 132 abut against the tapering surface of the corresponding grasping recess 134A, so that the clutch member 130 is grasped or held by the grasping device. Thereafter, as described above for the first embodiment, the robot arm or the like, having the grasping device mounted on its distal end, positions the clutch member 130 in a rotational direction, using a rotational position recognition device, and then mounts the clutch member 130 on a clutch boss 80 of the reel 14.

The rotation-limiting rib 110 and the seating rib 114 having different shapes because of their different functions have the respective chucked portions 120 and 132 whose distal end portions have substantially the same shape. Therefore the grasping device can grasp the clutch member 130 by the pair of chuck member 134 of the same shape without displacing the clutch member 130 relative to the imaginary straight line L1. Therefore, in the structure to be grasped of this second embodiment, basically similar effects to those of the first embodiment can be obtained. Namely, in the recording tape cartridge 10 to which the structure to be grasped of this second embodiment is applied, the clutch member 130 can be grasped by the pair of chuck members 134 having respective grasping recesses 134A of the same shape.

In this second embodiment, the pair of abutment surfaces 120A, inclined relative to the imaginary straight line L1, abut against the corresponding chuck member 134, while the pair of abutment surfaces 132A, inclined relative to the imaginary straight line L1, abut against the corresponding chuck member 134. By doing so, the clutch member 130 is grasped by the chuck members 134, and is prevented from displacement in the imaginary straight line L1 and a direction perpendicular to the imaginary straight line L1. Therefore, there is no need to provide play, between the chucked portion 120 and the grasping recess 134A and also between the chucked portion 132 and the grasping recess 134A, as in the first embodiment in which the chucked portion contacts the chuck member at three surfaces thereof. Therefore, even when the grasping force, applied from the pair of chuck members 134, is set to a relatively small level, the grasped clutch member 130 is positively prevented from shaking and displacement. Advantageous effects, obtained by the arrangement in which the chucked portions 120 and 132 are disposed on the side of the axis C of the clutch body 108, and advantageous effects obtained by the fact that the rotation-limiting ribs 110 and the seating ribs 114 perform different functions, are basically the same as described in the first embodiment.

In the above embodiments, although three sets of rotation-limiting ribs 110 and seating ribs 114 are provided, the invention is not limited to such a construction, and the invention can be applied to a member having at least one set of two projecting portions disposed on a common imaginary straight line L1. Therefore, for example, the chucked portions 120 and 124 can be formed only at one set of one rotation-limiting rib 110 and one seating rib 114, disposed respectively on the common imaginary straight line L1. And the clutch members 106, 130 can be provided with one or multiple sets of a rotation-limiting rib 110 and a seating rib 114. In the invention, the body portion is not limited to the circular shape (when viewed from above) like the clutch body 108, but can have any other suitable shape. Therefore, the imaginary straight line L1 does not always need to pass through the axis C of the body portion.

In the above embodiments, although the rotation-limiting portions 122 of the rotation-limiting ribs 110 and the seating portions 126 of the seating ribs 114 project outwards radially from the clutch body 108, the invention is not limited to such a construction. A construction can be adopted in which one or both of each rotation-limiting portion 122 and each seating portion 126 do not project radially outwardly from the clutch body 108. Or a construction can be adopted in which one of the rotation-limiting portions 122 and the seating portions 126 are not provided, in which case the remaining portions also performs the function of the missing portions. In the latter case, one of the set of two projecting portions may not be provided with the second function portion (and therefore has only the second grasped portion). In the invention, the first function portion or the second function portion performs its function when inserted into the respective first or second groove. It is at least necessary that the set of two projecting portions be of an overall different shape from each other.

Although the above embodiments are directed to the respective clutch members 106 and 130 being mounted on the reel 14 of the recording tape cartridge 10, the invention is not limited to such embodiments, but can be applied to any other suitable use. Therefore, it will be readily appreciated that the invention is not limited by the construction of the recording tape cartridge 10 including the opening 20, the door 50, the brake member 84 and so on.

As described above, the structure to be grasped of the present invention has an excellent advantage in that a member to be grasped can be grasped by a pair of grasping portions having grasping recesses of the same shape.

What is claimed is:

1. A structure to be grasped of a member including a set of two projecting portions which are formed on and project from a body portion thereof, and are disposed on an imaginary straight line, wherein a pair of grasping portions of a grasping device are moved away from each other along said imaginary straight line to abut respectively against said projecting portions, so that said member is grasped by said grasping device;

wherein one of said projecting portions includes a first grasped portion which can be fitted into a grasping recess, formed on one of said grasping portions, so as to be prevented from moving in a direction perpendicular to said imaginary straight line, and a first function portion which is integral with said first grasped portion, and is so formed as to perform a required function; and wherein the other of said projecting portions is different in shape from said one projecting portion but includes a second grasped portion which is substantially similar in shape to said first grasped portion.

2. The structure according to claim 1, in which each of said first and second grasped portions has a substantially rectangular shape when viewed from above, and contacts said grasping portion at three surfaces thereof.

3. The structure according to claim 2, in which said body portion is formed into a substantially cylindrical shape, and said set of two projecting portions are arranged in a diametrical orientation on said body portion; and said first and second grasped portions project from an end surface of said body portion, and are fitted respectively into said grasping recesses when said pair of grasping portions are moved outwards radially from a region close to the axial side of said body portion towards the periphery of said body portion.

4. The structure according to claim 3, in which said first function portion extends outwards radially from said body portion, and is inserted into a first groove in another member on which said member is to be mounted.

5. The structure according to claim 4, in which a second function portion is formed integrally with said second grasped portion, and said second function portion extends outwards radially from said body portion, and is inserted into a second groove in said other member.

6. The structure according to claim 1, in which each of said first and second grasped portions has a substantially trapezoidal shape when viewed from above, and contacts said grasping portion at two oblique surfaces thereof inclined relative to said imaginary straight line.

7. The structure according to claim 6, in which said body portion is formed into a substantially cylindrical shape, and said set of two projecting portions are arranged in a diametrical orientation on said body portion; and said first and second grasped portions project from an end surface of said body portion, and are fitted respectively into said grasping recesses when said pair of grasping portions are moved outwards radially from the axial side of said body portion towards periphery of said body portion.

8. The structure according to claim 7, in which said first function portion extends outwards radially from said body portion, and is inserted into a first groove in another member on which said member is to be mounted.

9. The structure according to claim 8, in which a second function portion is formed integrally with said second grasped portion, and said second function portion extends outwards radially from said body portion, and is inserted in a second groove in said other member.

10. The structure according to claim 1, in which said body portion is formed into a substantially cylindrical shape, and said set of two projecting portions are arranged in a diametrical orientation on said body portion; and said first and second grasped portions project from an end surface of said body portion, and are fitted respectively into said grasping recesses when said pair of grasping portions are moved radially outwards from the axial side of said body portion towards the periphery of said body portion.

11. The structure according to claim 10, which said first function portion extends outwards radially from said body portion, and is inserted into a first groove in another member on which said member is to be mounted.

12. The structure according to claim 11, in which a second function portion is formed integrally with said second grasped portion, and said second function portion extends outwards radially from said body portion, and is inserted in a second groove in said other member.

* * * * *